Sept. 1, 1964 E. P. MORSE 3,146,755
MARINE OUTBOARD TRANSMISSION AND DRIVE
UNIT FOR INBOARD POWER PLANTS
Filed April 22, 1960 13 Sheets-Sheet 1

INVENTOR
EARL P. MORSE
BY Raymond N. Matson
ATTORNEY

INVENTOR
EARL P. MORSE

BY Raymond N. Matson

ATTORNEY

Sept. 1, 1964   E. P. MORSE   3,146,755
MARINE OUTBOARD TRANSMISSION AND DRIVE
UNIT FOR INBOARD POWER PLANTS
Filed April 22, 1960   13 Sheets-Sheet 8

INVENTOR
EARL P. MORSE
BY Raymond N. Matson
ATTORNEY

INVENTOR
EARL P. MORSE

INVENTOR
EARL P. MORSE

BY Raymond N. Matson

ATTORNEY

INVENTOR
EARL P. MORSE
BY Raymond N. Matson
ATTORNEY

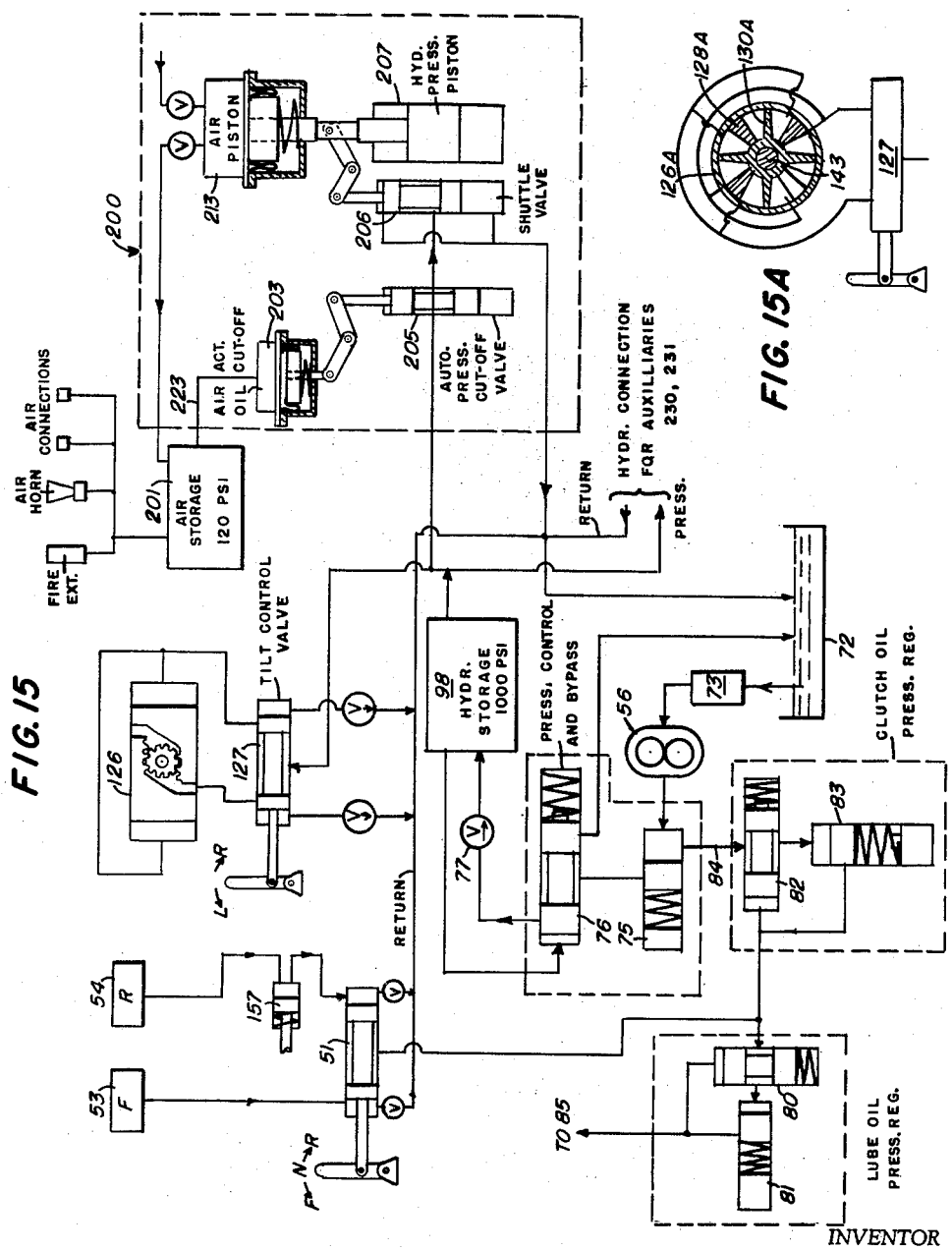

Sept. 1, 1964  E. P. MORSE  3,146,755
MARINE OUTBOARD TRANSMISSION AND DRIVE
UNIT FOR INBOARD POWER PLANTS
Filed April 22, 1960  13 Sheets-Sheet 13
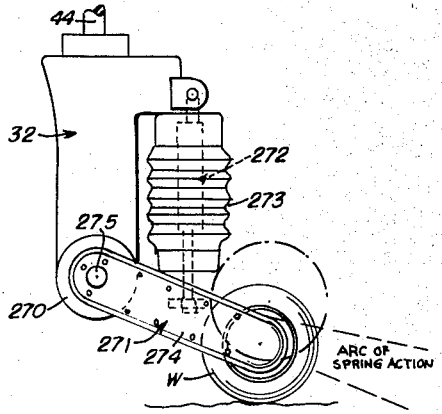
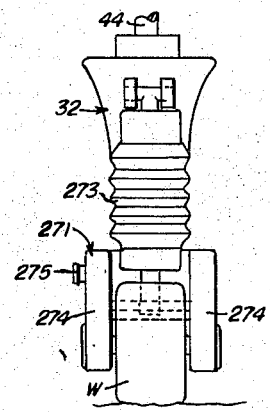
FIG. 19  FIG. 20
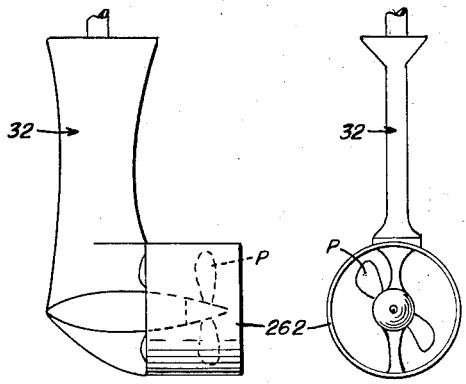
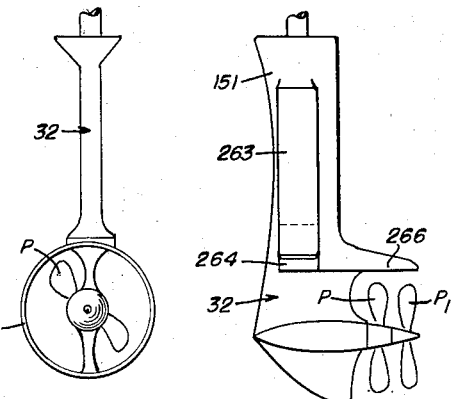
FIG. 21  FIG. 22  FIG. 23
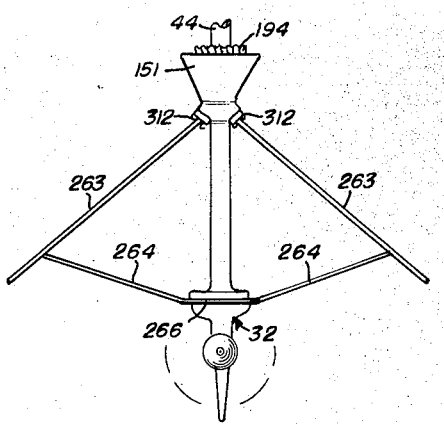
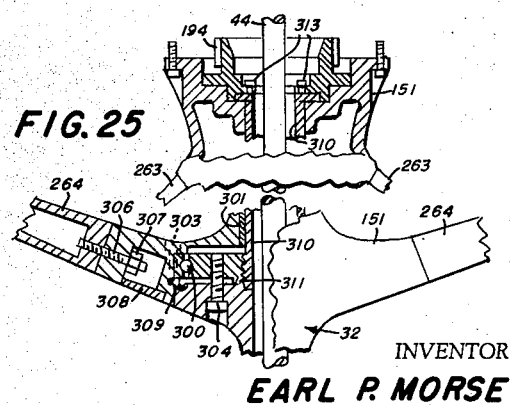
FIG. 24
FIG. 25
INVENTOR
EARL P. MORSE
BY *Raymond N. Matson*
ATTORNEY United States Patent Office 3,146,755
Patented Sept. 1, 1964

3,146,755
MARINE OUTBOARD TRANSMISSION AND DRIVE
UNIT FOR INBOARD POWER PLANTS
Earl P. Morse, 78 Shed St., Quincy, Mass.
Filed Apr. 22, 1960, Ser. No. 23,965
28 Claims. (Cl. 115—35)

This invention relates generally to marine propulsion apparatus and more particularly to a novel, compact, outboard transmission and drive unit adapted to be mounted on the transom of a boat for connection with an inboard power plant.

Marine propulsion units of both the inboard and outboard types have long been known and each type has a number of practical advantages over the other so that both types are highly popular with different segments of the boating public.

The main object of the present invention is to combine the best features of both types so as to provide a propulsion apparatus characterized by spectacular performance in terms of safety, fuel economy, maneuverability, versatility, efficiency, and cost.

An important object of the present invention is to provide a versatile marine propulsion apparatus for outboard attachment to a boat transom and connection therethrough with an inboard power plant.

Another important object of the present invention is to provide an improved outboard propulsion apparatus wherein the drive unit: is readily interchangeable with others having different features and performance characteristics and usable on land as well as primarily in the water; is pivotable through a vertical plane to avoid damage from underwater obstructions or to permit beaching; effects automatic ignition cut-off when the unit is tilted past the usual driving angle; is automatically tilted to a predetermined degree only during reverse operation to lift the stern of the boat; is provided with shock absorbing means to cushion the tilting movement; may have a hydrofoil instead of the usual cavitation plate; and may have a shrouded and/or venturi center propeller.

A further important object of the present invention is to provide an improved propulsion apparatus of the type described wherein a totally enclosed housing construction includes forward and reverse gears, clutches operating the same, an oil pump and a complete hydraulic power system with controls therefor, a hydraulically operated pneumatic power generator and system, pneumatic and hydraulic power take-off connections, a cooling and lubrication system, and controls for the drive unit tilt and steering mechanism.

A still further important object of the present invention is to provide an improved outboard transmission and drive unit wherein a tiltable drive unit is provided with means for adjusting a preset resistance to or drag against tilting, is rotatable about a vertical axis through a limited arc to effect steering, and is vertically adjustable to properly position the hydrofoil cavitation plate with respect to the bottom of the boat.

A further object of the present invention is to provide an air pressurizing system including automatic controls therefor and a compressed air storage tank.

A still further object of the present invention is to provide a complete hydraulic power system with controls therefor.

Another object of the present invention is to provide an improved outboard transmission and drive unit which is totally enclosed, may be readily disassembled in sub units for repair or replacement, is compact and light in weight although sturdy and of long life in use, and which may be readily and economically manufactured.

Other objects and advantages of the present invention will become apparent during the course of the following description.

In the drawings I have shown one embodiment of the main combination of the invention and several embodiments of various features thereof. In these showings:

FIGURE 15 is a diagrammatic view of the hydraulic system embodied in the propulsion apparatus comprising the present invention;

FIGURE 15A is a diagrammatic showing of a multi-blade rotary tilt mechanism actuator shown in FIGURES 12, 12A and 12B which may be substituted for the opposed piston actuator shown in FIGURE 15;

FIGURES 19 and 20 are side and rear elevational views respectively of a detachable lower unit embodying wheels for highway use;

FIGURE 21 is a side elevation of another form of drive unit showing the use of a shroud about the propeller;

FIGURE 22 is a rear elevational view thereof;

FIGURE 23 is a side elevational view of another form of interchangeable drive unit embodying hydrofoils, and optionally, the use of a second contra-rotating propeller on the same propeller shaft;

FIGURE 24 is a rear elevational view thereof, and

FIGURE 25 is a sectional detail view of the upper and lower portions of FIGURE 24.

Figure 1:
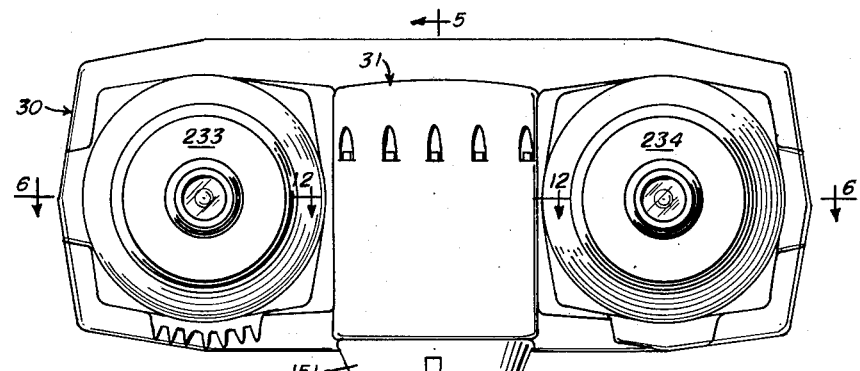
FIGURE 1 is a fragmentary rear elevational view of the transmission and drive unit comprising the present invention, the lower portion of a lower drive unit therefor being shown in other views such as FIGURES 5, 14, and 19 to 24 inclusive.

In its broader aspects, the propulsion apparatus comprising the present invention is a totally enclosed and completely self-contained unit adapted to be mounted on a boat transom in which two holes are cut and through which the drive shaft (for connection to the inboard power plant), and controls extend into the boat. The unit comprises a main housing for various of the components and a gear box pivotally mounted therein, the lower portion of the gear box terminating in a readily detachable drive unit (for interchangeability, etc.) having a propeller and including a number of novel features as does the main housing and the components therein. Adequate housing seals render the entire device completely water and oil tight.

Referring to the drawings, it will be seen that the transmission and drive unit comprising the present invention includes and is housed in, in a water-proof and oil-tight manner, an upper, U-shaped main housing 30 on and between the legs of which a gear box or housing 31 is pivoted for rotation through a limited arc in a vertical plane, a drive unit 32 including a propeller being detachably connected to the lower portion of the housing 31 as will be described.

The transmission and drive unit is readily installed on a boat B (FIGURE 14) by cutting two, relatively small, spaced holes in the transom T to permit the projection therethrough of the transmission drive shaft 33 and controls to be described. Using heavy rubber sealing gaskets 37 (FIGURE 8), the main housing 30 is then clamped to the transom T by bolts, the drive shaft 33 being suitably drivably coupled to an enclosed drive shaft of the boat power plant E which may be of any desired type.

*Transmission*

Figure 5:
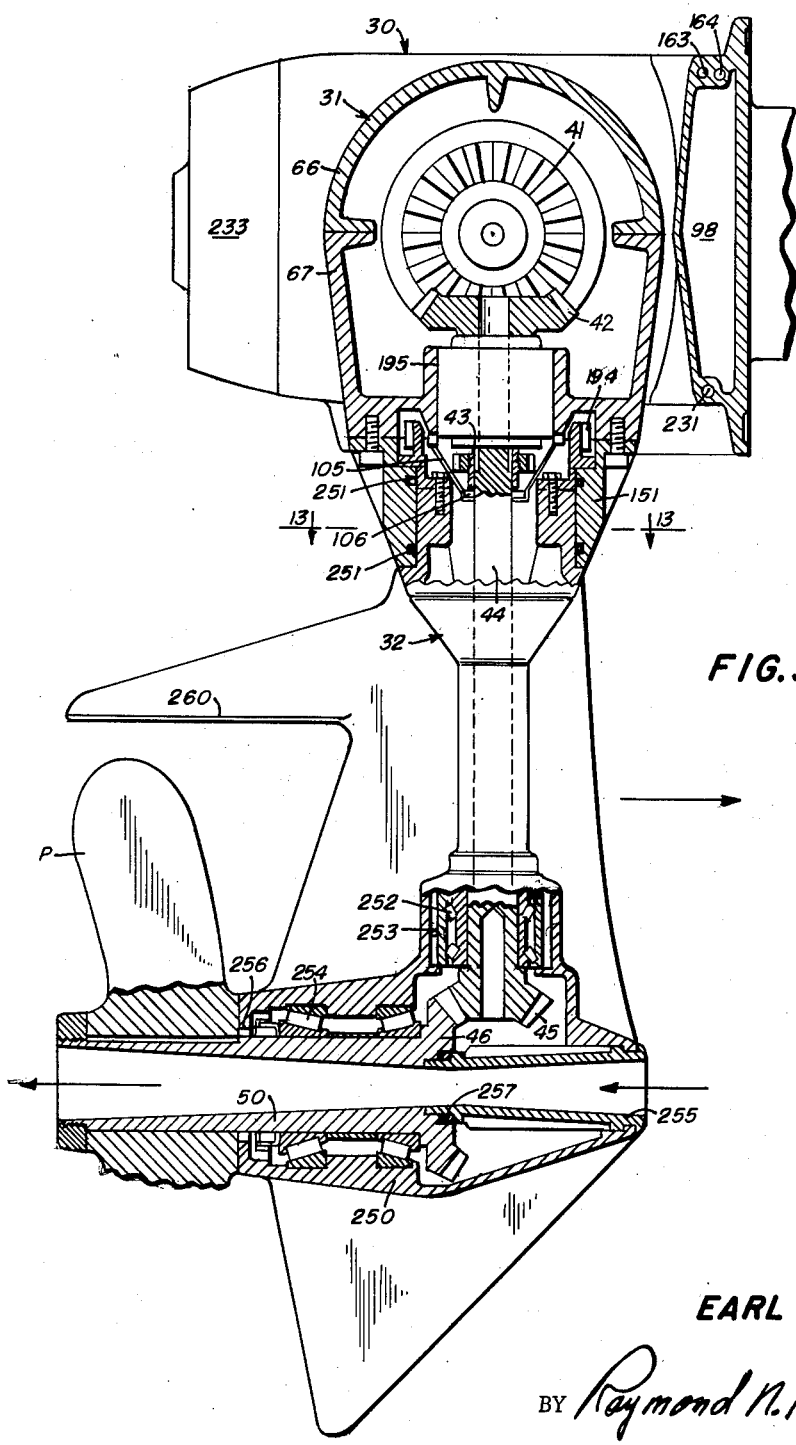
FIGURE 5 is a central vertical section thereof taken on the line 5—5 of FIGURE 1 showing the manner of attachment of a drive unit and a hollow, venturi propeller shaft.

Briefly stated, the drive from the power plant E to the propeller P of any of the interchangeable drive units 32 is by the drive shaft 33, through either a forward speed, spiral bevel gear 34 or a reverse gear 35 (depending upon which pair of oil actuated, disc plate clutches are engaged as will be described) both of which are constantly in mesh with a gear 36 fixed to or mounted on one end of a short, hollow shaft 40, to a gear 41 fixed to the other end thereof within the gear box 31. The gear 41 drives a gear 42 integral with or fixed to a hollow internally splined shaft 43 within which (FIGURES 5 and 9) is received the externally splined, upper end of the vertical drive shaft 44 of the drive unit 32. The drive is transmitted by the shaft 44 to meshing spiral bevel gears 45 and 46, the latter as shown in FIGURE 5 being integral with or fixed to a venturi type propeller shaft 50 upon which the propeller P is suitably keyed and secured.

The transmission is hydraulically controlled by a three-position control valve 51—forward, neutral and reverse—mounted on a circular valve housing 52 bolted to the front of the housing 30 and (FIGURES 6 and 8) projecting through one of the holes in the transom. The spiral bevel gears 34 and 35 are selectively coupled by a pair of oil actuated, disc plate clutches 53 and 54 respectively, located at the rear of each gear and keyed together by dowels 57 and held together axially by split rings 58. The spiral bevel gear 36 is always in mesh with the gears 34 and 35 and its direction of rotation is determined by which clutch is engaged by oil pressure.

A hydraulic pump 56 has its stator built into the rear face of the valve housing 52 and its rotor fixed to the transmission drive shaft 33 and provides high pressure hydraulic power for the transmission and all of the hydraulic components of the propulsion unit independently of any oil supply used by the inboard power plant E.

The pump 56 operates only when the power plant E is operating.

The drive shaft 33 always turns in the same direction as the shaft of the power plant and fluid operated engagement of the clutch 53 causes the gear clutch plates and bearings to turn as a mass in the same direction as the drive shaft 33, the reverse gear 35, bearings and associated parts turning in the opposite direction due to the mesh with the gear 36. It is to be noted that the power plant shaft and the propeller shaft rotate in opposite directions in forward speed so that their respective torque reactions tend to neutralize the resultant effect on the boat B.

The shaft 33 is supported by tapered roller bearings 59 and 61 adjacent its ends (FIGURE 6) within the housing 30. A combination nut and bearing support 60 secured on the aft end of the drive shaft 33 holds the inner bearing race of the tapered roller bearing 61 against the clutch disc plate carrier 54, the outer race being mounted in a recess in the aperture of the housing inner end plate 62, the aperture being closed by a screw cap 63. Removal of the parts 60–63 inclusive permits the ready removal of the forward and reverse gears, clutches, and the rotary joint to be described when it is disconnected from its side mounting in the housing. The shaft 33 is also supported adjacent its end by needle bearings 64 positioned in bearing cavities in the housing 52 and in the clutches 53 and 54.

The gear housing 31 is rotatable about bearing support provided by the short shaft and bearing housing 39 which is bolted to the inner face of the port leg of the main housing 30, and on the shock absorber assembly 65 which is bolted to the upper and lower castings 66, 67 of the rotatable gear box 31. The pivot and bearing support is within an aperture 70 formed in the inner face of the starboard main housing leg.

The lower casting 67 of the rotatable gear box 31 contains the bearings 71 for the internally splined, hollow shaft 43, the attachment point of the drive unit mounting ring and the support of the components of the steering gear mechanism. The rotatable gear box 31 is free to pivot in a fore and aft direction with respect to the boat. It is constrained against rotary movement under various conditions by the anti-tilt stop mechanism to be described, which is engaged during reverse power.

*Lubrication*

Figure 4:
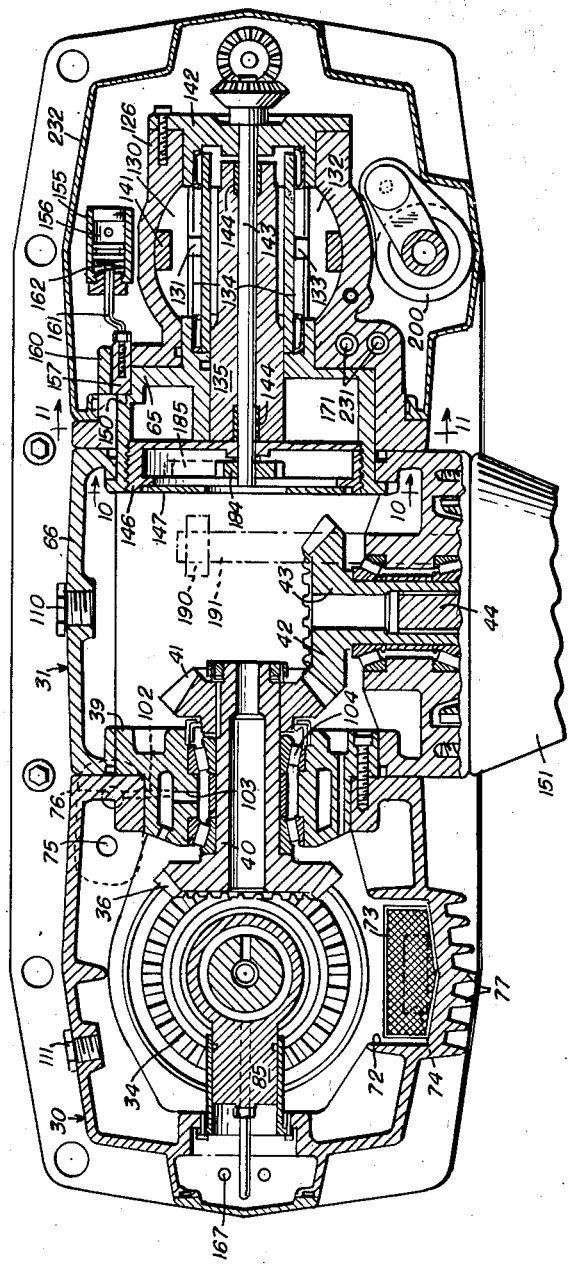
FIGURE 4 is a fragmentary vertical sectional view to an enlarged scale of the propulsion apparatus taken on the line 4—4 of FIGURE 2.

The bottom of the port leg of the main transmission housing 30 comprises an oil sump 72 which includes a screen 73 (FIGURES 4 and 8) and the inlet therefrom to the pump 56 is by way of an enlarged port 74 in the main housing casting. The pressure side of the pump elements similarly passes through another port in the main casting to the pressure control and by-pass valves 75 and 76 (FIGURE 4).

The lubrication oil pressure control and metering valves 80 and 81 are located in the pump and control valve housing 52 (FIGURE 6), the oil line branching off of an inlet to the clutch pressure control valve 51. If the pump elements 56 are running at rated pressure (1000 p.s.i.), the clutch pressure and metering valves 82 and 83 regulate the volume of oil flowing and lower the pressure through these valves to 200 p.s.i. When the pump is running with the by-pass valves 75 and 76 open, the pressure in the clutch supply line 84 is 250 p.s.i. but is similarly lowered to 200 p.s.i. by the clutch pressure and control valves 82 and 83.

Thus, the oil pressure entering the lubricating oil circuit is limited to 200 p.s.i where it is again lowered to 50 p.s.i. by the lubrication oil pressure control 81 and metering values 80. Oil causes a spring in the valve 81 to compress when the oil pressure reaches 50 p.s.i. Oil then flows toward the rotary joint 85 but the lubricating oil requirements are small compared to the capacity of the pump 56 and the pressure in the oil lines will exceed the desired pressure of 50 p.s.i. Another spring in the oil metering valve 80 will compress at 55 p.s.i. causing the valve to move across the oil supply line 86 to the rotary joint 85 and limit the volume of oil flowing through this line. If the valve 80 completely blocks this oil line, the oil pressure on the rotary joint side of the circuit will drop and allow the metering valve 80 to open until the pressure rises. These valves reach an intermediate position where the oil pressure is regulated between approximately 50 to 55 p.s.i. and pressure is self-regulating as the bearing clearances increase with wear.

Once the required oil pressure is attained, oil flows into the center groove 90 of the rotary joint 85 and enters the main drive shaft 33 which has a control bore 93 extending rearwardly from a point adjacent the roller bearings 59. An oil distribution tube 94 is so mounted in the bore as to form an outer oil passage 95 for the flow of lubricating oil forwardly and rearwardly to lubricate the bearings but separate inner coaxial bores 96 and 97 for the flow of oil at 200 p.s.i. to the forward or rear clutches 53 and 54, whichever is in use. Where the lubricating oil passage crosses the holes in the main shaft 33 servicing the clutches, the oil flows through a spiral groove on the outer surface of the oil distribution tube 94 that is so arranged as to avoid the grooves 91 and 92 connecting the holes in the main shaft with the bores 96 and 97 leading to the forward and reverse clutches 53 and 54. The oil distribution tube 94 is furnace brazed to the main shaft 33.

After lubricating the needle bearings 64, plain bearing 100 and flanged bearing 101 (FIGURE 8) and the clutch plates, the oil runs through the clearance space between the bearings 100 and 101 and the main shaft 33 and is returned to the oil sump 72 at the bottom of the transmission case, oil leaving the bearing 100 lubricates the roller bearing 61. The oil level at the bottom of the transmission case covers the tips of the spiral bevel gears 34, 35, and 36 so that the remainder of the transmission parts are splash lubricated.

A small diameter oil passage 102 runs from the side of the large by-pass passage leading from by-pass valve 76 (FIGURE 4) to the oil sump 72 and leads to an opening 103 in the short shaft housing 39 where the oil lubricates the roller bearing, etc. 104. The housing 39 allows oil to flow from the transmission into the rotatable gear housing 31 where it will be at the same level as the oil in the transmission. The upper and lower castings 66 and 67 of the housing 31 use rubber and felt seals to prevent oil leakage. The seal carrier 105 and the seal 106 enable the lower unit 32 and the vertical drive shaft 44 to be removed without draining oil from the rotatable gear box 31 and the transmission. Drain plugs 107 and 110 are used to drain and flush the transmission and rotatable gear box respectively while a filler plug and vent 111 in the transmission prevents excessive pressure build-up in both the transmission and the gear box.

Clutches

As stated, the forward, neutral and reverse speed mechanism is located in the port leg of the transmission housing and the direction of propeller rotation is determined according to which one of the gears 34, 35 is coupled to the drive shaft 33 through an oil actuated piston 112 acting against the clutch plate 113 which are keyed to the gear and clutch driving cups 53, 54. The mating clutch plates 114 are keyed to the clutch plates and spring carriers 115 of the forward and reverse clutches which are splined to the drive shaft 33. Oil is admitted to the clutch pressure chambers 116 from one of the two oil passages of the rotary joint or manifold 85 and directed internally through the drive shaft 33 through either of the passages 96 or 97.

When the clutch control valve 51 is in its neutral position, both of the clutch pressure chambers 116 drain through the control valve drain ports to the oil sump 72. The drive shaft 33, clutch plates 114 and spring carriers 115, turn when in neutral and are lubricated by oil entering the center port 90 of the oil distribution manifold or rotary joint 85, and following a spiral surface cut on the outside of the oil distribution tube 94. The spiral grooves enable lubricating oil to be directed by four holes in the drive shaft admitting or draining oil from the clutches. The mating inner clutch plates 114 are prevented from contact with the outer clutch plates 113 through the action of piston return springs 121 against the pistons 112. Thus, in neutral both clutch cups 53 and 54 and driving gears 34 and 35 are stationary and there is no drive to the propeller.

Figure 6:
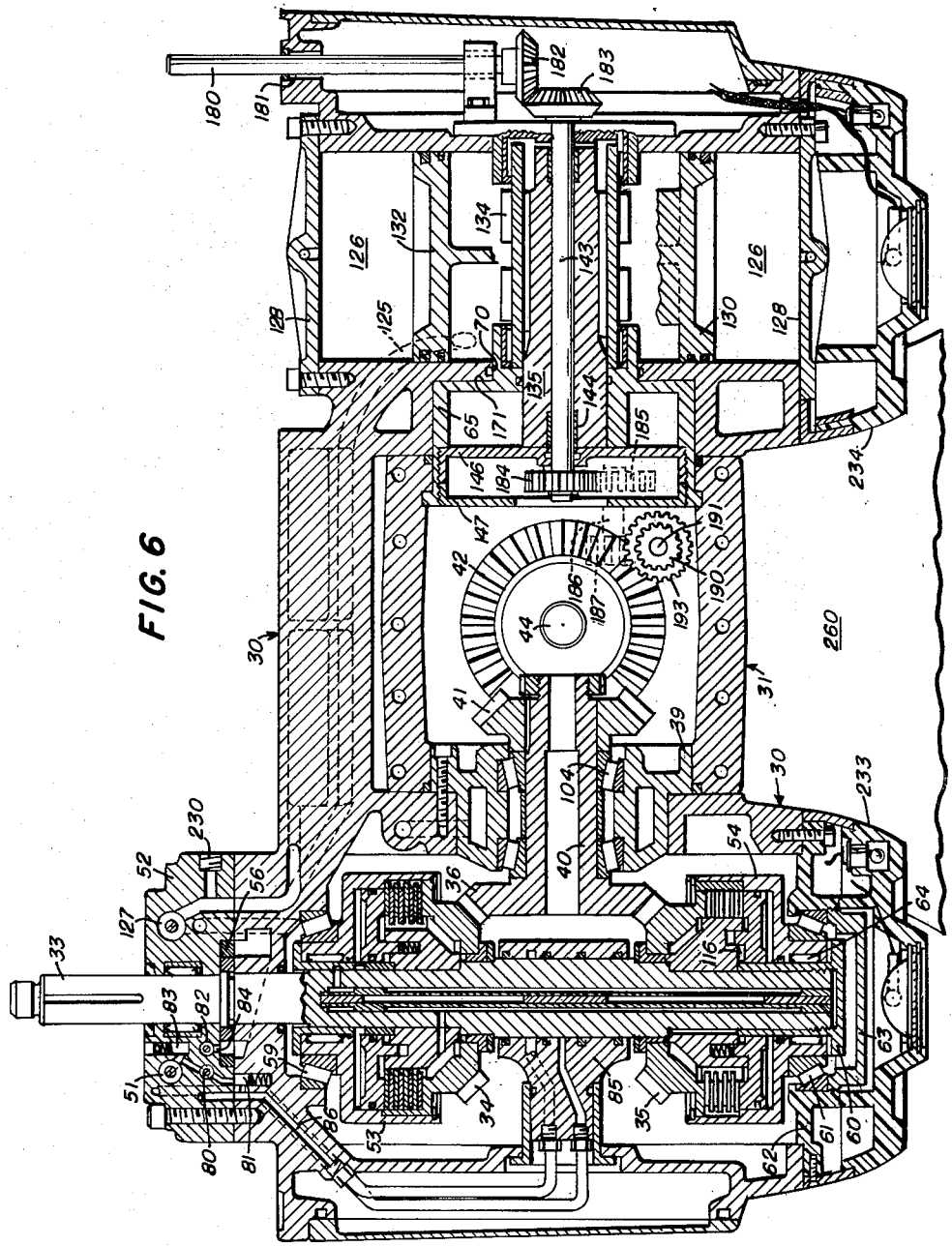
FIGURE 6 is a horizontal sectional view thereof taken on the line 6—6 of FIGURE 1.
Figure 8:
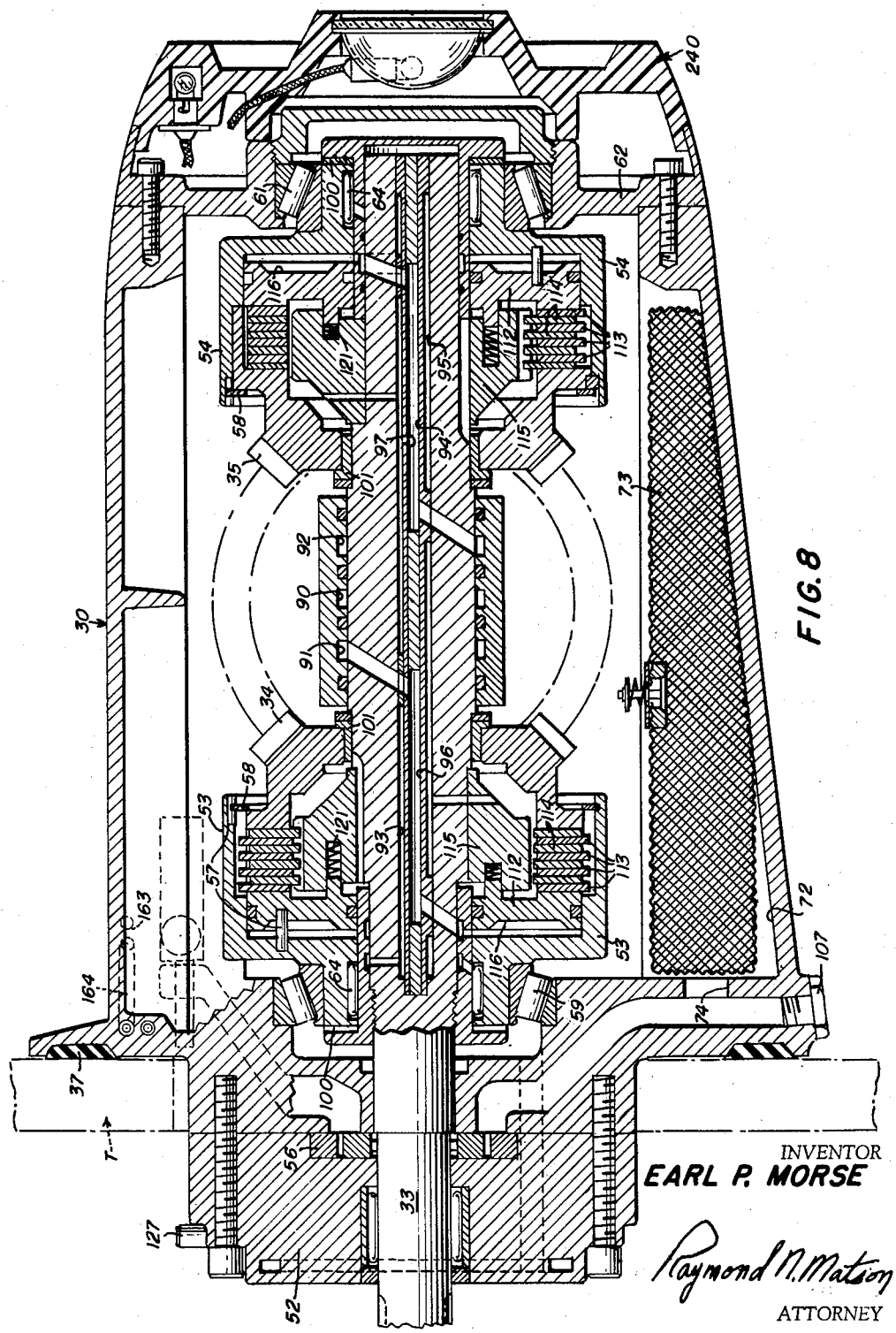
FIGURE 8 is a vertical sectional view thereof taken along the line 8—8 of FIGURE 2.

The clutch cups or housings 53 and 54 are supported on the drive shaft 33 by needle bearings 64 and flanged bearings 101 and outwardly by the tapered roller bearings 59 and 61, the outer end of the former being supported in the housing casting and the latter in the inner housing cover and bearing retainer 62 (FIGS. 6 and 8). The bearings and gears are readily adjusted when assembled by means of variable thickness spacers, washers, and sleeves.

Cooling

As is apparent from the drawings, most of the oil lines of the hydraulic circuit are cast in position as an integral part of the aluminum main housing 30. The primary hydraulic circuit uses a small amount of oil at low pressure continuously. The remainder of the oil, several gallons per minute, passing through the pump 56 is dumped through the by-pass metering valve 76 into the oil reservoir 72.

The outside of the main housing 30 is exposed to water spray and cool air and the continuous recirculation of oil carries heat generated within the transmission to cool the inside parts of the transmission side of the housing. The high pressure or secondary hydraulic circuit never operates more than a few minutes at a time so that only a small amount of heat is generated and is similarly cooled through the main housing. The only hydraulic component likely to generate a significant amount of heat is the air pressure generator to be described. If this were of a larger size or used more than intermittently, the oil line would be coiled around the check valve and air chamber housing 221 and returned to the oil reservoir 72 to be cooled by the main housing. It is to be noted that the bottom of the transmission leg of the aluminum main housing 30 is provided with cooling fins 77 which are adequate to dissipate the heat generated by the transmission.

Tilt Control Mechanism

The angle between the vertical propeller shaft 44 and the transom T of the boat which is called the "stern angle," is variable in a fore and aft direction by means of a hydraulically actuated mehcanism under all conditions including that of full speed and power.

Figure 2:
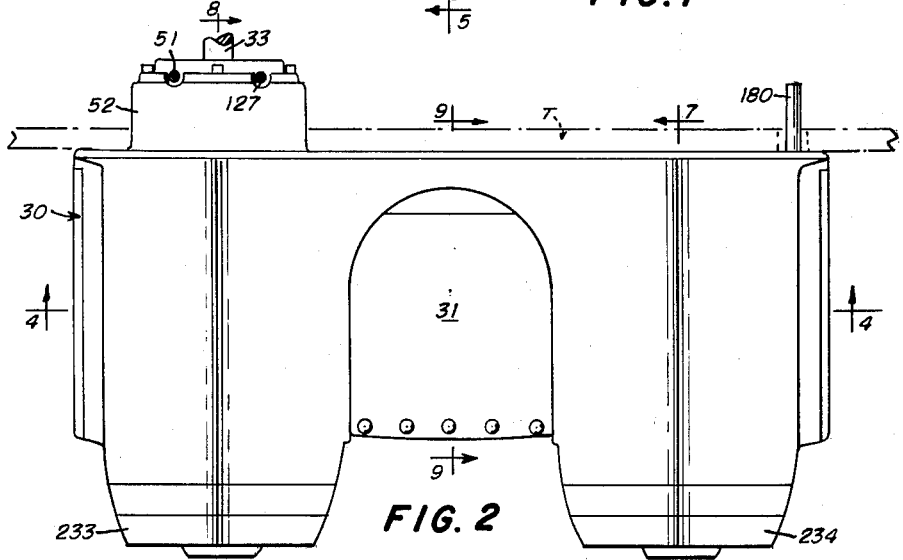
FIGURE 2 is a top plan view thereof.
Figure 3:
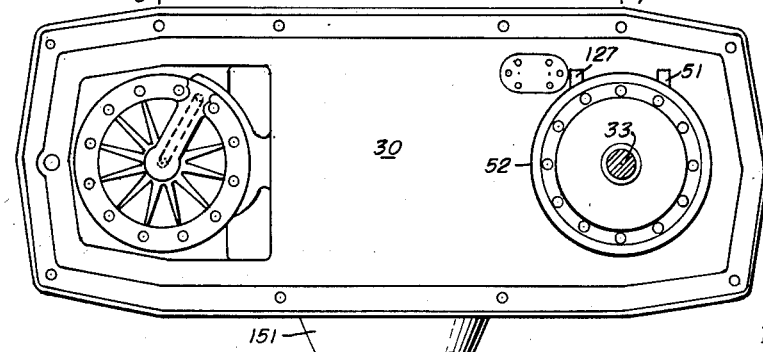
FIGURE 3 is a fragmentary front elevational view thereof.

The tilt control mechanism is part of the secondary or high pressure hydraulic circuit as it requires pressure to move the tilt mechanism but not to maintain an adjusted position because the oil lines 124 and 125 to the tilt control cylinder 126 are blocked by the tilt control valve 127 causing the piston and rack mechanism to be hydraulically locked in position. The tilt control valve 127 (FIGURES 2 and 3) is connected to the pressurized oil storage tank 98 so as to permit smoother oil circuit operation and it allows the lower unit 32 to be partially raised or lowered by manipulation of the tilt control valve 127 without the engine running, that is, until the oil supply pressure drops until it is no longer effective to actuate the mechanism.

The tilt control mechanism is contained within the starboard leg of the main housing (FIGURES 4, 6 and 7) and includes a cylinder 126 having a pair of cylinder heads 128 and two reciprocable horizontally opposed pistons 130, 132 each having an integral toothed rack 131, 133 which mesh with a pinion 134 which is internally spliced to mate with the external splines of a tilt control cam 135. The cam portion 136 is located within the shock absorber housing 65 and by contact with the cam contact surface of the housing, causes the axis of the rotatable gear box 31 and lower drive unit 32 to change according to which sides of the pistons 130, 132, oil is admitted within the tilt control cylinder 126.

Each of the pistons 130, 132 have a longitudinal slot 140 machined in the surface of their racks 131, 133 opposite the rack teeth for the reception of rack guides 141 which are bolted to the housing. This ensures that the pistons and their racks are maintained in alignment and prevents jamming of the mechanism and scoring of the piston cylinder 126. The pinion 134 is positioned by a pair of needle bearings one of which is retained by an extension of the shock absorber housing 65, and the other by a bearing retainer and cover 142 which is bolted and gasketed to the main housing 30. The tilt control cam 135 is hollow and supports in its bore a shaft 143 of the steering mechanism by means of spaced sleeve bearings 144. Oil seals located within the main housing 30, the shock absorber housing 65 and cover plate 142 prevent oil from leaking out of the tilt control mechanism.

Figure 10:
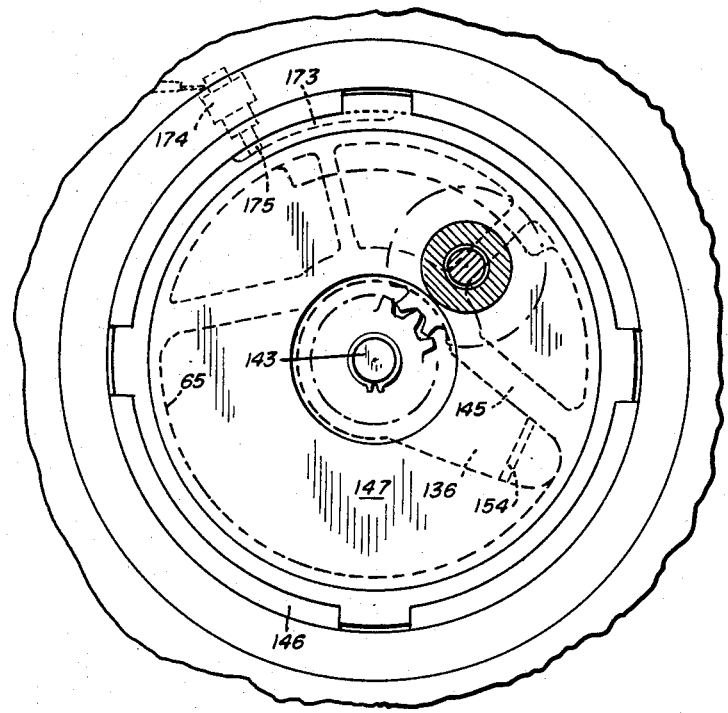
FIGURE 10 is a vertical sectional view to a further enlarged scale taken on the line 10—10 of FIGURE 4 of the shock absorber.
Figure 11:
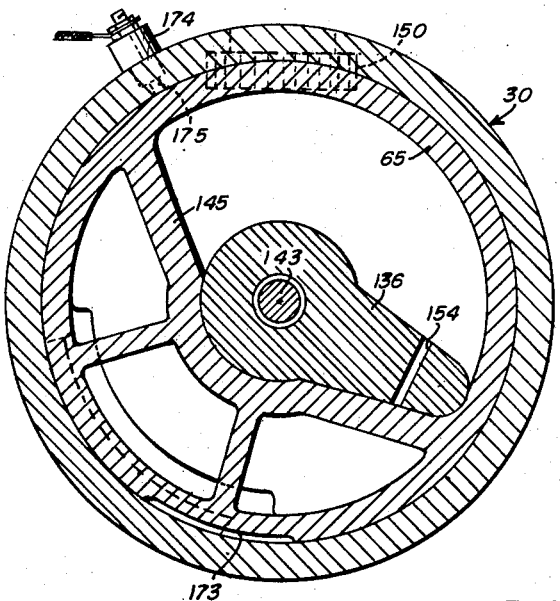
FIGURE 11 is a vertical sectional view thereof taken on the line 11—11 of FIGURE 4.
Figure 12:
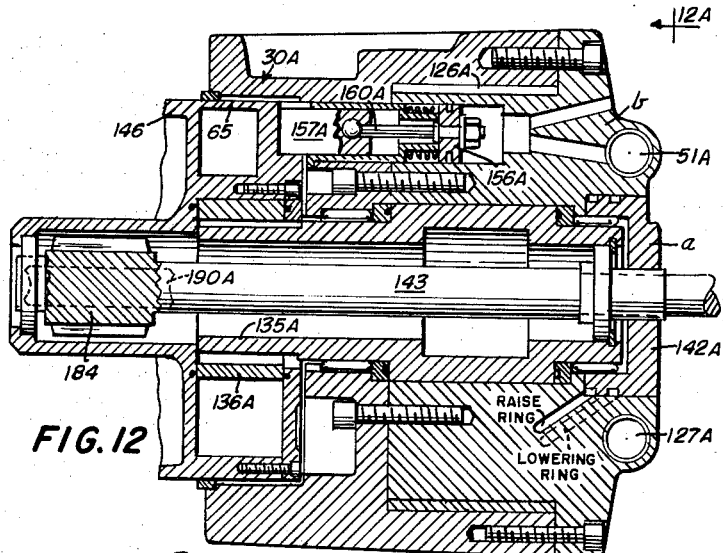
FIGURE 12 is a central, vertical sectional view of a modified form of the tilt mechanism contained in the starboard side of the main housing.
Figure 12A:
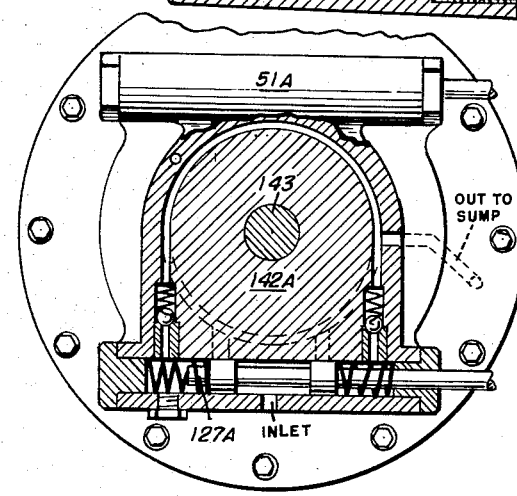
FIGURE 12A is a vertical sectional view thereof taken on the line 12A—12A of FIGURE 12, parts being shown in elevation.
Figure 12B:
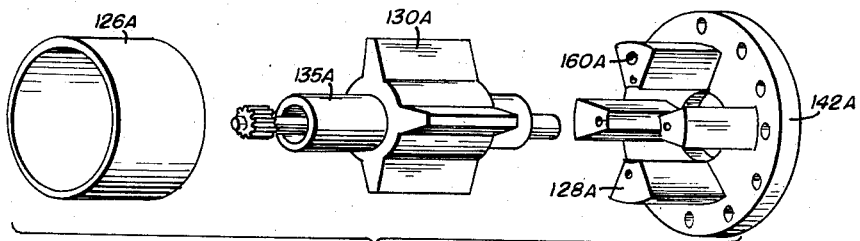
FIGURE 12B is an exploded view of the main elements shown in FIGURE 12.

The lobe 136 of the cam 135 rests against the driving face 145 of the shock absorber assembly housing 65 (FIGURES 10 and 11). The rim of this assembly being bolted to the rotatable gear box assembly 31, the motion of the pistons 130, 132 in either direction is translated into rotary motion of the gear box with a corresponding change in the "stern angle." The piston travel is controlled by the spring loaded, closed center, hydraulic valve 127, meaning that with the control valve in its neutral position, fluid against each face of the pistons 130, 132 is trapped or locked in position. Turning the control valve cylinder either side of the neutral position uncovers a port allowing fluid to enter one side of the pistons and exhaust from the other.

When fluid enters from the cylinder cover sides 128 of the pistons and is exhausted from the center fluid compartment between the pistons, the propellor P and unit 32 moves in the aft direction. By reversing the fluid flow, which is accomplished by moving the control valve 127 to the opposite position, the propeller P moves in the opposite or forward direction. The tilt control valve 127 is spring loaded to return to the neutral (or piston locked) position automatically and to change tilt position, the control is moved to the appropriate port and held until the propeller axis has reached the desired position, or the desired "stern angle" is obtained.

A modified form of tilt actuating mechanism is disclosed in FIGURES 12, 12A, 12B and 15A and comprises a rotary, four bladed actuator of comparable power as the opposed piston type described while occupying materially less space. In this form of the actuator, a cylinder 126A is mounted concentrically with the shaft 143 and cam shaft 135A in the starboard side of the housing 30. A plurality of angularly spaced vanes 130A fixed to the cam shaft 135A on the shaft 143 are closely received within the cylinder 126A and adapted to rotate between the similarly spaced vanes 128A fixed to the housing cover 142A, in one of which is a guide hole 160A for the anti-tilt stop 157A. As indicated in FIGURE 15A, hydraulic fluid may be selectively admitted to either side of each of the rotatable blades 130A in the areas between the fixed vanes 128A to rotate the cam shaft 135A in either direction to vary the tilt of the gear box 31 and detachable drive unit 32 which may be rotated through an angle up to 48°.

The housing cover 142A may be modified so as to include the valves 51 and 127 and also the pressure metering and control valves 75, 76, 77, 80, 81, 82, and 83, and the hydraulic circuit with the exception of the lubricating oil line, forward and reverse clutch lines, and the inlet and the outlet from the oil pump 56. Also the return lines from the various hydraulic components may enter one large return line cast into the lower portion of the main casting 30 running through the lower portion of the hydraulic storage tank 98 to the sump 72 located on the transmission side. With all of the valves in part 142A, a blocking valve may be added to the hydraulic circuit to block the inlet to the valve 127 during reverse operation so that the reverse stop mechanism cannot be damaged by inadvertent forward rotation of the tilt control mechanism. Alternatively, the inlets to the pressure chambers of the tilt control mechanism may be similarly blocked.

Shock Absorber

The shock absorber is a multi-purpose component whose primary function is to act as an internal heavy duty shock absorber to snub the motion of the rotatable gear box 31 and lower unit 32 if solid contact is made with an underwater obstruction and will use the damping capacity of the shock absorber through an arc of 150° before coming to a complete stop. As previously stated, the shock absorber assembly is one of the gear box pivots and includes a recess for engagement of the anti-tilt reverse stop to be described. The shock absorber assembly controls an automatic ignition cut-off switch by its angular position, it supports some of the change gears of the steering mechanism, is a bearing retainer for a needle bearing used in the tilt control mechanism, and has provision for adjustment of the friction or drag between the rotary gear box and the main casting.

The shock absorber assembly is composed of the malleable iron or machine steel parts 65 forming a housing having the driving face 145, an inner housing 146 which is closed by a gear supporting plate 147 which is angularly adjustable. The housing 65 supports one end of the pinion 134 and the tilt control cam 135 is assembled with its lobe 136 in a compartment for fluid formed by and between the housings 65 and 146. A recess 150 extending through an arc of 30° is cast in the housing (FIGURE 4) 65 which engages the anti-tilt reverse stop to be described and the housing contains lugs which act as keys to cause the upper and lower gear box castings 66 and 67 to rotate as one when the shock absorber assembly turns inside the bearing support machined in the starboard leg of the housing 30.

Figure 9:
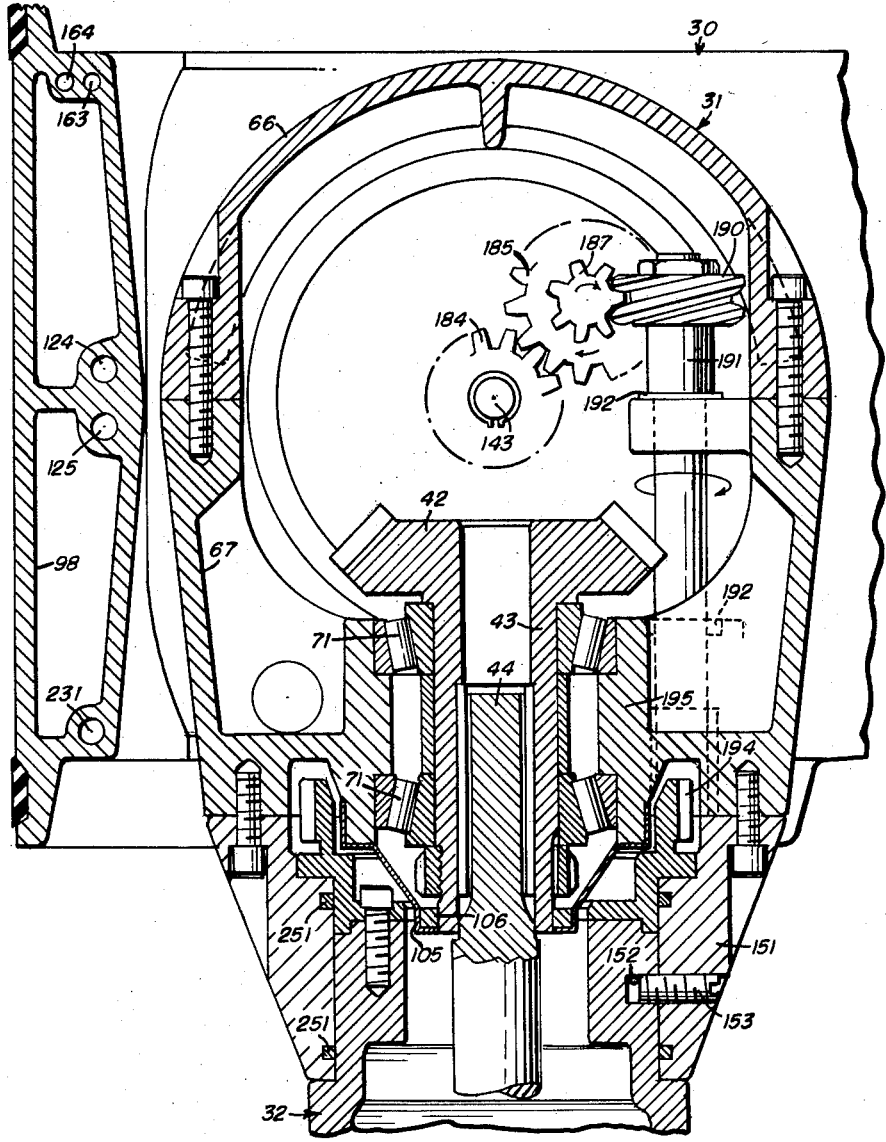
FIGURE 9 is a fragmentary vertical sectional view thereof taken along the line 9—9 of FIGURE 2.

The shock absorber assembly can be caused to turn in three ways: (1) When the tilt actuator cam 135 is caused to turn through the tilt control pistons and racks 130–133, and pinion 134, the lobe 136 of the cam 135 is pushed against the cam contact surface 145 (FIGURES 10 and 11) and will rotate the shock absorber assembly, the rotary gear box 31 and the lower detachable unit 32 through an arc corresponding to the travel of the actuator pistons or about 90°. (2) The lower unit 32 is rotatably mounted for steering purposes to the rotatable gear box 31 by means of a mounting ring 151 bolted thereto (FIGURES 5 and 9). To normally limit the steering arc for safety to 90°, a slot 152 is formed and a pin 153 mounted in the ring 151 projects into the slot.

Figure 14:
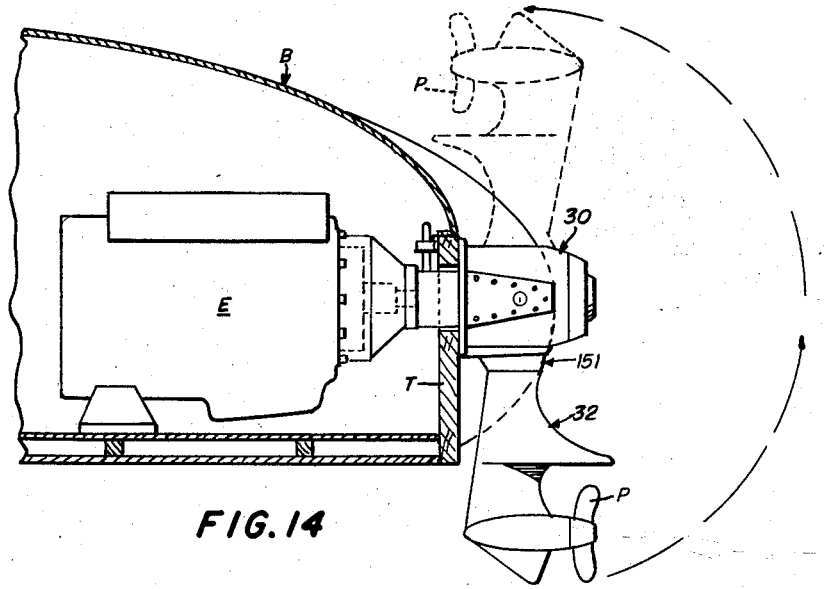
FIGURE 14 is a diagrammatic elevational view showing the propulsion apparatus mounted on the transom of a boat and operatively connected therethrough with an inboard engine; the dotted line illustrating the arc through which the drive unit may be pivoted.

When the steering mechanism has caused the stop pin 153 to engage the end of the slot, the shock absorber assembly and the gear box 31 will either raise or lower (depending on the direction the steering gear is turned) from the position it was left by the tilt actuator cam lobe 136 (FIGURES 10 and 11) to a position approximately 180° from the normal driving position of the propeller to where the lower unit 32 and propeller P are completely retracted or nearly vertical (FIGURE 14).

The propeller will be turned sideways from its amidships driving position to 45° to port or starboard. In other words, the steering gear mechanism turns the lower unit 32 to the limit of its useable steering travel before contacting the stop pin 153 to raise or lower the propeller P by manual control of the steering mechanism. (3) With the propeller in its driving position, the cam contact surface 145 (FIGURE 10) holds the lower unit 32 from turning in the direction of the propeller thrust by contact with the cam lobe 136. However, if an underwater obstruction is contacted, the shock absorber assembly is free to rotate aft until the opposite surface of the tilt control cam has entrapped the oil which is between these surfaces.

Inasmuch as oil is incompressible, it can only flow through a lobe orifice 154 and the clearances between the parts 65 and 146 of the shock absorber and the lobe and thus functions as a heavy duty shock absorber to snub the motion of the lower unit 32 before the propeller P can damage either the transom or the transmission and drive unit structure.

Anti-Tilt Reverse Stop

The anti-tilt reverse stop mechanism prevents the drive unit 32 from tilting aft when reverse power is used due to the change of direction of propeller thrust with resultant loss of steering control. An important feature of the invention resides in the fact that when reverse power is used, the drive unit 32 is automatically tilted aft through an arc of 15° aft of the vertical centerline regardless of the position of the tilt actuating mechanism.

The 30° arcuate recess 150 in the housing 65 affords a ±15° adjustment between the aft extreme of this adjustment and the point of ignition cut-off. As stated, the reverse stop 157 is positioned before the reverse clutch is actuated. Thus, when reverse propeller torque is applied, the shock absorber housing 65 swings from its forward driving position so that the other end of the housing recess 150 contacts the reverse stop 157. This has the effect, during an emergency shift to reverse, of creating slight but significant lifting of the stern and dropping of the bow of the boat B. This causes the hull to act as a brake by increasing its drag or area pushing against the water.

The anti-tilt reverse stop mechanism is automatically and hydraulically controlled through the 200 p.s.i. clutch pressure circuit. A small cylinder 155 (FIGURES 4 and 7) containing a piston 156 attached to the stop 157 is connected to the oil lines from the transmission control valve 51 and to the reverse clutch pressure chamber 116. A gasketed guide 160 for the stop 157 is bolted to the section of the main housing 30 enclosing the shock absorber housing 65 to restrain the stop from all motion except in the direction moved by the piston rod 161. A piston return spring 162 encircles the rod 161 and functions to retract the piston and the anti-tilt stop when the clutch control valve 51 is in either its neutral or forward speed position in which the oil lines 163, 164, 165, 166, 167 from the reverse clutch chamber 116 drain to the transmission oil reservoir or sump 72.

When the clutch control valve 51 is moved to its reverse speed position, oil flows through the oil lines 163 and 165 to the sides almost at the cover end of the cylinder 155 where the piston 156 causes the stop 157 to enter the recess 150 in the shock absorber housing 65. After filling the cylinder 155, the oil flows through the lines or conduits 164, 166 and 167 to the oil distribution manifold or rotary joint 85 where it enters the reverse clutch fluid compartment 116. Thus, the sliding stop 157 is in position before the reversed propeller can develop thrust and a slight time delay is effected, the operation otherwise being almost instantaneous. When the valve 51 is returned to neutral or forward position, the cylinder 155 is drained of oil releasing the anti-tilt stop 157 and the lower unit 32 now being free to rotate, will automatically return to its former tilt angle adjustment.

Drag Adjustment

If the transmission and drive unit is to be used for exceptionally rough sea conditions, provision is made for the adjustment of the drag of the rotatable gear box 31 to prevent the lower unit 32 from bouncing away from contact with the contact surface of the shock absorber housing 65. Normally, the thrust of the propeller holds the lower unit 32 through the shock absorber housing pressure face 145 against the tilt control cam lobe 136. However, when operating without the drag adjustment in a sea rough enough to bring the propeller out of the water, the lower unit 32 may be swung aft by the action of the sea. As soon as the propeller returns to the water, the lower unit will return to its original position.

Figure 17:
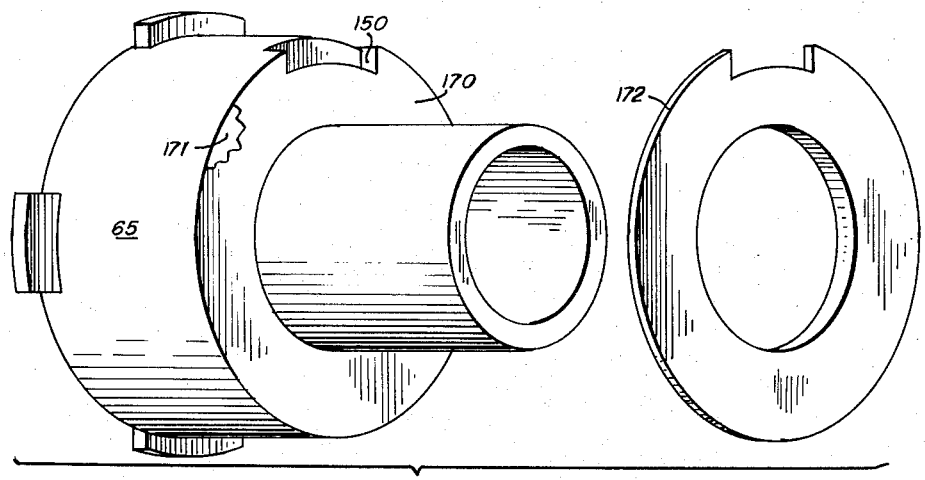
FIGURE 17 is an exploded view of the elements of the drag adjustment for the rotatable drive gear housing.

It is not likely that these oscillations of the lower unit could cause damage to the propulsion device because of the double action characteristic of the shock absorber and the friction in the pivot points of the rotatable gear box 31. The drag adjustment is accomplished by cementing a friction material in the form of a friction plate 170 (FIGURE 17) to the face 171 of the shock absorber housing 65 and installing a pressure ring 172 between the face 171 and the main housing 30. The friction level is established by three bolts extending through the main housing and pushing the pressure ring 172 against the friction plate 170.

Automatic Ignition Cut-Off

The rotatable gear housing 31 includes a safety device which prevents the inboard engine E from being started with the propeller P retracted, and automatically stops the engine if the lower unit 31 contacts an underwater obstruction. A recess 173 (FIGURES 10 and 11) is machined in the peripheral surface of the shock absorber housing 65 and the length of the recess corresponds to the arc of tilt adjustment useable with the propeller driving. A switch 174 which is part of the engine ignition circuit, is mounted in the main housing 30 and has an ignition cut-off plunger 175 which travels in the recess when the circuit contacts are closed. When the shock absorber assembly turns (upon pivoting of the rotatable gear housing 31 and lower drive unit 32) until the switch plunger 175 rises on the bearing shoulder of the housing 65 at the end of the recess 173, the contacts of the switch 174 open to stop the engine E.

Steering

The steering mechanism has a dual purpose in the interests of safety and of flexibility of use. Firstly, the rudder angle as controlled by the steering mechanism is limited to a total rudder travel of 90° as a 45° port or starboard rudder angle is more than adequate on a high speed hull. Secondly, as the steering mechanism is turned past the maximum rudder angle, the propeller P will either raise from or lower into the water depending on the direction the steering shaft is turned. This is another important feature and permits the raising or lowering of the propeller without the engine running.

The steering mechanism disclosed (FIGURES 4–6) is mechanical through four pairs of gears and interconnecting shafting and may be hydraulic power assisted if desired. A steering shaft 180 projects through the transom T to the inside of the boat B when it is connected to a steering wheel (not shown). The shaft 180 is supported in the starboard leg of the main housing 30 by a pair of spaced sleeve bearings 181. A bevel gear 182 on the aft end of shaft 180 drives a bevel gear 183 fixed to the shaft 143 on the opposite end of which is fixed a spur gear 184 which drives a spur gear 185 mounted on a shaft 186 which drives a helical gear 187. The gears 185 and 187 are supported by the shock absorber housing plate 147 which is angularly adjustable. Helical gear 187 drives a helical gear 190 which is fixed to the upper end of a shaft 191 which is supported by flanged bearings 192 (FIGURE 9) located within the lower gear box housing 67. A gear 193 on the lower end of the shaft 191 drives the bull gear 194, which is bolted to the lower drive unit 32. Turning of the steering connecting shaft 180 is transmitted through the above steering components to rotate the lower drive unit 32 and cause it to also function as a rudder. The bull gear 194 has a flanged ring which serves to retain the rudder functioning, lower drive unit 32 within the mounting ring 151. The transmission and drive unit may be constructed as right or left hand for complementary use as twin drive installations. Using one of each, the steering would be interconnected externally of the boat. When two models of the same hand are installed on a boat, the steering is coupled together inside the boat. A 360° rotation of the lower unit is a common feature of outboard motors but in the present construction, the time required to shift from forward to reverse or vice versa, is considerably less than the time needed to change the rudder angle by 180°. If desired, of course, the stop pin 153 may be retracted from the slot 152 to permit a full 360° rotation of the drive unit 32.

Steering Gear Ratios

Different types and sizes of boats have different handling characteristics and boat operators have individual preferences concerning steering ratios. Such preferences are accommodated by the four pairs of steering mechanism gears which enable a steering ratio range of from 15 to 1 to 2 to 1, whereas the number of turns of the steering wheel to effect a desired turn may vary from 3¾ to ½ turns.

It will be apparent that changing the hand of the gears 187 and 190 causes the direction of rotation of the propeller shaft to be reversed. Since some steering wheels that would be connected to shaft 180 (FIGURE 6) employ one of more gears in their assembly, the gearing is thus adaptable to either direction of rotation of the shaft 180 so that turning of a steering wheel to port causes steering of the boat to port. It will be appreciated that the gears 184, 185, 187 and 190 may be replaced by a worm pinion attached to shaft 143, and a worm gear attached to shaft 191, the worm gear set being either right or left handed. Either method enables the use of twin installations of the invention, each with the actuator side inboard with a common shaft 143 or an extension thereof between them and using shaft 180 and gears 182 and 183 of only one installation.

The tilt actuators would be independently controlled to permit a trim adjustment when a quartering wave effects one side of a boat more than the other. Also, the twin units could have their straight ahead positions varied by one or more gear teeth to effect either toe-in or toe-out of the rudder portions of the units 32 to offset engine torque or any boat tendency to turn off course.

Compensation For Tilt Adjustment

The most effective range of the tilt control mechanism is 30° although the actual adjusting range is limited to where the automatic ignition cut-off switch 174 becomes open circuited. The tilt control mechanism is a relatively slow acting but powerful hydraulic mechanism. Changes in the tilt adjustment have an effect on the rudder or lower driver unit position since the pivot point of the rotary gear box 31 is the same as the center of the steering gears 183, 184 and their supporting shaft 143. Assuming the steering gear is firmly held, changes in tilt adjustment are reflected to the steering gear mechanism through the gears 185, 187, 190, 193 and 194. This means the rudder angle will change by an angle represented by the change in tilt adjustment divided by the mechanical advantage or steering ratio between gears 184 and 194.

Steering and Propeller Torque Separation

Considerable difficulty is normally experienced in outboard drives due to a lack of separation or proximity of steering components to the components transmitting power from the engine to the propeller. In the present invention this effect is eliminated by providing support for the power transmisison components independently of the steering components as shown by the drawings. As illustrated in FIGURES 5 and 9, the gear 42 and vertical propeller shaft 43 are supported by the tapered roller bearings 71 which are surrounded by and supported in a well 195 formed in the lower gear box housing 67. The bull gear 194 which is the final drive of the steering gear mechanism, attaches to the lower unit 32 and it will be noted that there is no connection between the steering and the power transmitting components. This torque separation is aided by the splined joint between the shafts 43 and 44. Any forces resultant from reversing the transmission are substantially reduced since the forces must be transmitted across this splined joint instead of through a solid shaft.

Manual Raising or Lowering of Lower Unit

When a boat is underway, the tilt control mechanism is used to turn the axis of the propeller (adjust the stern angle) to obtain optimum operating conditions in terms of speed and compensation for load or sea changes. The tilt control mechanism has adequate power for changing and maintaining the position of the lower unit 32 against the maximum propeller thrust but it is not needed to retract the unit from the water. Instead, the lower unit is raised by continued turning of the steering wheel, for example, to the left which causes the unit to move to its full port rudder position where the stop pin 153 locks all of the gears in the steering mechanism except 182 and 183. Gear 183 is then effectively locked to the rotary gear box 31 and continued turning of the steering wheel causes the lower unit to retract until it is constrained from further rotation by the tilt control cam lobe 136 contacting the opposite surface 145 of the reversing position of the shock absorber housing 65 as shown by FIGURE 11. Thus the lower unit may be retracted via the steering wheel and shaft to a position between 150° and 180° from the normal operating position. Conversely, the lower unit may be lowered to normal driving position by continued rotation of the steering wheel to the right.

The addition of a fluid motor (not shown) to effect a power-assisted steering mechanism allows the above operating sequence to be automatic even without the engine running as long as pressure in the oil supply tank 98 is high enough to overcome the friction of the rotatable gear box 31 and lower unit 32. Without the engine E running, oil used by the power assisted steering is drained from the 1000 p.s.i. oil storage tank and returned to the oil sump 72 of the transmission. The oil supply is enough to retract and lower the unit 32 several times before the oil pressure drops to an ineffective level. When the engine is started, the supply tank is recharged.

Auxiliary Connections

The pressure unloading and automatic cut-off valves allow the engine to expend a minimum of energy for the demands of the secondary hydraulic circuit. The capacity of the pump 56 may be increased by simply making the rotor and stator thicker which enables it to readily supply hydraulic power to additional auxiliary components and adds substantially to the utility of the boat. Among such components are: a combination water pump and dual rotation winch (not shown) driven by a single hydraulic motor—or a winch and a water pump separately driven; and retractable forward hydrofoils with an angle of attack adjustment (not shown).

There are two sets of auxiliary hydraulic connections to the hydraulic circuit. One set 230 (pressure and return) is located on the control valve and pump housing 52 (FIGURE 6) and the other set 231 of auxiliary oil supply connections is located on the actuator side of the main housing 39 (FIGURE 4). The power steering mechanism and the air pressure generator are connected to this latter set for use.

The Hydraulic System

The hydraulic system hereinbefore referred to is schematically shown as a whole in FIGURE 15 of the drawings. As previously described, the hydraulic pump 56 is built into the port leg of the main housing casting 30 and is driven by the drive shaft 33, and is in operation only when the engine E is running. Most of the fluid lines or conduits are of stainless steel tubing cast in the main housing 30.

The hydraulic system is completely self-contained as illustrated by the schematic diagram and includes all essential elements to the system such as pump, filter, reservoir, pressure tank, valves, etc. The elements of the pump are stock elements and the pump is rated at 1000 p.s.i. in continuous operation. Through pressure dividing valves, the pump runs at 250 p.s.i. or substantially unloaded to continuously satisfy the demands of the primary hydraulic circuit. These are a lubricating oil pressure of 50 p.s.i. and a required clutch pressure of 200 p.s.i. The secondary circuit is satisfied after the primary circuit and is used intermittently at high pressure—1000 p.s.i.—to operate the tilt mechanism and the air pressure generator to be described, and to furnish high pressure at auxiliary connections for remote hydraulic elements.

The Air Pressure Generator

Compressed air has many uses aboard a boat such as in the operation of air horns, pressurizing fire extinguishers, inflating life rafts, pressurizing water tanks for potable supply and/or to feed water to spray nozzles to wash gasoline fumes out of confined hull spaces after refueling.

Figure 16:
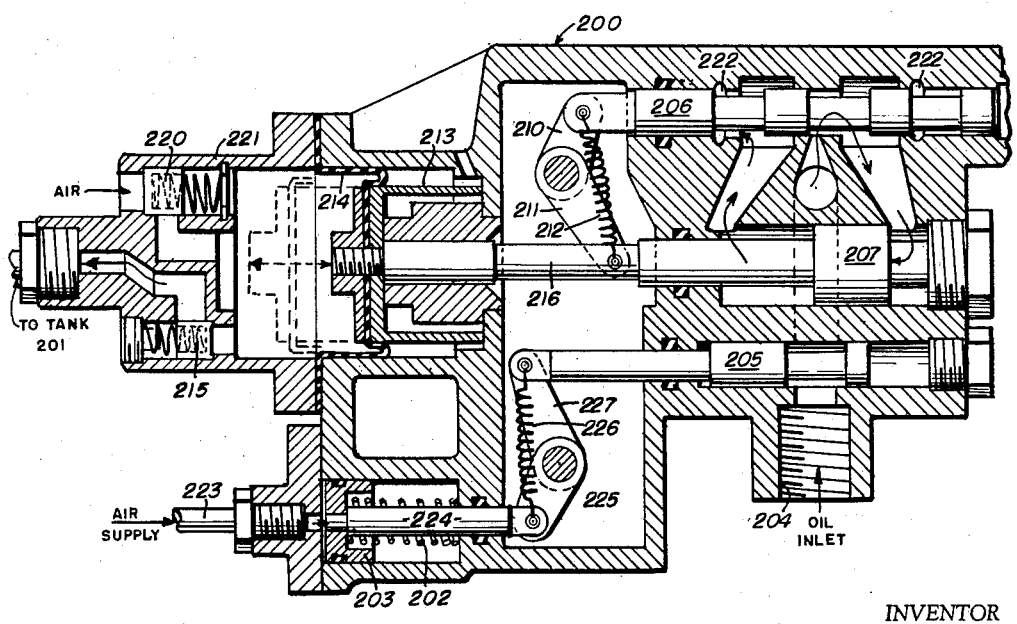
FIGURE 16 is a sectional view of the air pressure generator embodied therein.

The air pressure generator 200 is mounted in the bottom of the starboard housing leg (FIGURES 4 and 7) under the tilt mechanism and as disclosed in FIGURES 15-16 converts high pressure oil energy of the hydraulic system described to air under high pressure. The ratio of the cross-sectional area of an oil actuated power piston to that of an air piston determines the air pressure generated. In commercial practice, the air pressure would be relatively low—90 to 250 p.s.i.—whereas in military practice, hardware exists that calls for air pressures of 3000 p.s.i. which can be provided by changing the oil-air piston ratio.

Assuming the air storage tank 201—which may be located in the boat B—is empty or has a pressure less than design, the air pressure generator will operate as follows when the engine E is started. If the force exerted by the pressure sensing spring 202 (FIGURE 16 shows the air generator 200 at the start of the compression stroke) against the pressure sensing piston 203 is greater than the force developed on the opposite side of the piston, the oil cut-off piston 205 (of pressure oil entering through inlet port 204 from the hydraulic system) will be in its retracted position. Oil is now free to flow around an undercut portion of piston 205 and enter a shuttle valve 206 through the center or inlet port.

The shuttle valve is connected to a power piston 207 through an overcenter linkage consisting of arms 210 and 211 and an overcenter spring 212. Oil is then directed to one or two oil passages by the position of the shuttle valve 206 where it then enters the corresponding side of the power piston chamber and forces the power piston 207 to the opposite end of the cylinder. The power piston is directly connected to an air piston 213 and causes a rolling diaphragm 214 to force compressed air through a check valve 215 to the air storage tank 201.

Near the end of the compression stroke, the arm 211 which is caused to move with the shaft 216 connecting the power and air pistons by an undercut portion, has traveled to a point that reverses the direction of spring pressure of the overcenter spring 212 that is connected to the arm 210 which now travels to the opposite end of its arc of action. The shuttle valve 206 is connected to the arm 210 the motion of which causes the valve to block the oil entering the passage used for the power piston compression stroke and open the oil passage to the power piston 207 used during the air induction stroke. This action reverses the flow of oil to the power piston just before it reaches the end of the compression stroke and stops the motion of the power piston 207 before the start of the air induction stroke by a cushion of oil. After the power piston has stopped, oil reverses its direction. Near the end of the air induction stroke, similar action of the overcenter linkage 210, 211, 212 and the shuttle valve 206 completes the cycle of operation of the power piston 207. At the start of the air induction stroke, the check valve 215 closes and three check valves 220 open to admit air to the air chamber of the check valve and air chamber housing 221.

The air pressure generator may be made double acting with another air cylinder on the opposite end of the power cylinder and the operation would be the same except when one is on the compression stroke, the other would be on the induction stroke. During this sequence of operation, the shuttle valve 206 alternately opens and closes a drain port 222 at each end of the shuttle valve chamber that drains the side of the power piston 207 not under pressure. The operation of the power piston 207, the shuttle valve 206, and related parts continues the alternating compression and induction strokes until the air storage tank 201 is at the required air pressure. When this is reached, air in a small conduit 223 from the storage tank causes the pressure sensing piston 203 to compress the pressure sensing spring 202 and through a shaft 224 cause the arm 225 and attached overcenter spring 226 to cause the oil cut-off piston 205 through the arm 227 to block the oil inlet passage 204 to the shuttle valve 206. This stops the air pressure generator and allows the energy used to operate this section of the high pressure hydraulic circuit to be restored to the engine.

If a significant amount of air is removed from the air storage tank 201, the resultant pressure drop will unbalance the oil-cut-off overcenter linkage 225, 226, 227 and cause the oil cut-off piston 205 to open the oil inlet 204 to the shuttle valve 206 and start the air pressure generator 200. The overcenter linkage used between the shuttle valve 206 and the power piston 207 operates twice per cycle while the linkage between the oil cut-off piston 205 and the air pressure sensing piston 203 cycles only once when the air supply tank 201 is recharged. The advantages of this design are its simplicity, low cost, relatively high operating pressure and the feature of unloading itself automatically from the hydraulic circuit, thus not putting continuous loads on the engine.

Totally Enclosed Construction

The transmission and drive unit comprising the present invention is totally enclosed by the housings 30, 31 and 32 and the components thereof such as the front, rear and side access plates of the port and starboard legs of the housing. None of the moving mechanical parts are exposed to the sea water or the atmosphere. An adequate number of seals is used to prevent oil and grease from leaking out of the outdrive and water from the outside from leaking in. The gasketed hood 232 covering the tilt control mechanism in the starboard leg of the housing 30 is mainly used to balance the configuration of the transmission and drive unit so as to give it a symmetrical appearance.

Totally Enclosed Construction, End Caps

Figure 7:
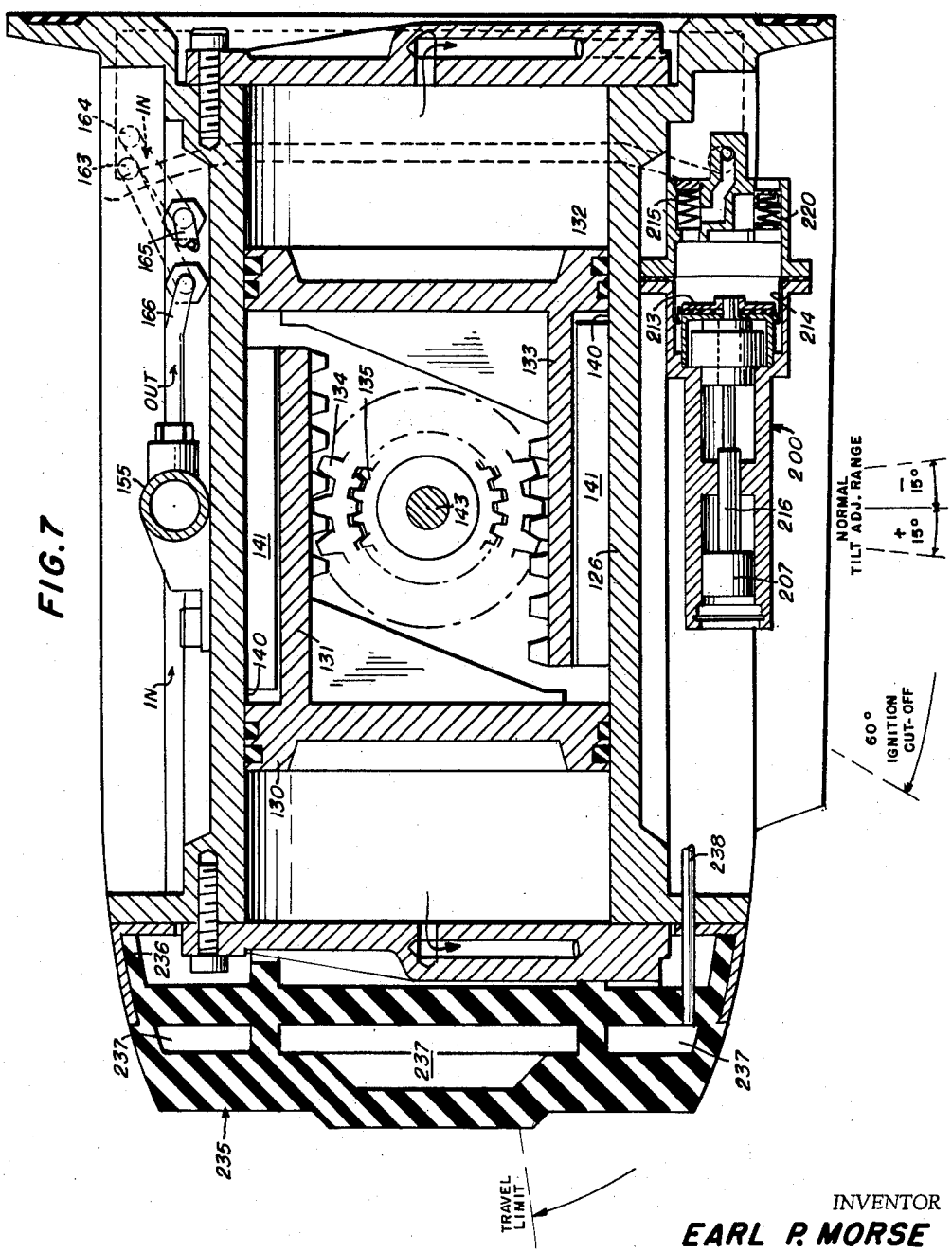
FIGURE 7 is a vertical sectional view thereof taken along the line 7—7 of FIGURE 2.
Figure 18:
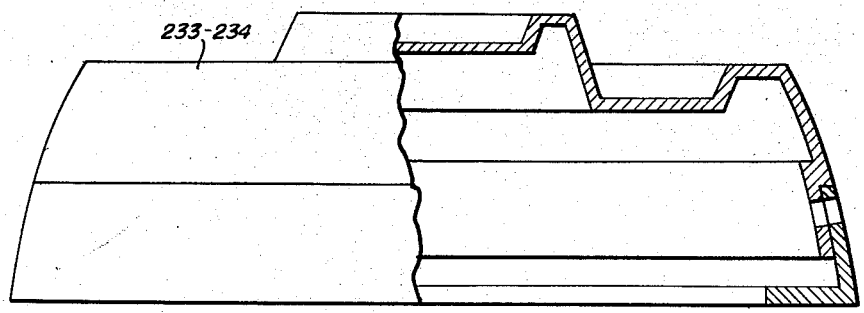
FIGURE 18 is a side elevational view of one of the end caps of the U-shaped housing.
Figure 13:
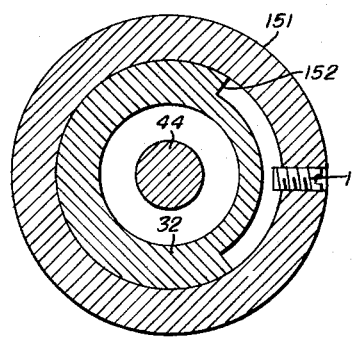
FIGURE 13 is a horizontal sectional view taken on the line 13—13 of FIGURE 5 showing the means for limiting the steering arc.

The caps 233 and 234 covering the aft end of the transmission and of the tilt control mechanism (FIGURES 1, 2, 4, 5–8, and 18) are used only to stylize the main housing 30 which remains oil and water tight when the caps are removed. As shown in FIGURE 18, the end caps 233, 234 may be substantially a hemi-spherical section of metal or fiberglass embossed or stamped to provide a finished and decorative appearance. A modified form of end cap is shown in FIGURE 7 wherein the cap 235 is formed of rubber molded so as to have an attaching peripheral flange 236 and connected air spaces 237 which are connected by a conduit 238 with the air pressure generator 200 or air pressure tank 201 so as to be pressurized so that the caps may act as bumpers when the boat B is being carried by a trailer. A further modification only for trailer use is shown in FIGURE 8 wherein the end cap 240 is similar to a conventional automotive tail light with tail, stop, directional and back-up lights mounted therein and suitably connected to an electrical circuit. Only the back-up lights would be connected to the boat's electrical system.

*Interchangeable Lower Units*

Various designs of detachable, lower unit drives 32 are shown in FIGURES 5 and 19 to 24 inclusive, and their ready interchangeability enables the transmission and drive unit to be used on planing hulls, displacement or work boats, hydrofoil equipped craft, or racing hulls. Each type of lower unit may have desired gear ratios effective to increase or decrease propeller speed.

*Hollow Center Propeller*

Conventional propeller and hub construction are characterized in use by a cavity of turbulent flow trailing the propeller. The improved propeller and shaft construction disclosed in FIGURE 5 obviates such inefficient conditions by providing a smooth, laminar flow through the center of the propeller hub. The aluminum casing 32 has a lower portion 250 which is bolted thereto along the horizontal centerline of the propeller shaft 50, it being understood that the upper end of the unit 32 is bolted to the flange of the bull ring 194 which is supported by the mounting ring 151 in which are mounted seals 251 which prevent the entry of sea water.

The lower end of the vertical drive shaft 44 is supported by a double, tapered roller bearing unit 252 mounted in a bearing retainer 253. The hollow propeller shaft 50 and its gear 46 are similarly supported by double, tapered roller bearings 254 adequately secured in the housing 250 and the propeller P is secured to the shaft by a special lock nut. A venturi cone 255 fits to form a water tight seal between the sections of the housings 32 and 250 and seals 256 and 257 prevent grease from leaking out or water from leaking in. The cross sections of the hollow shaft 50 and the cone 255 are so shaped as to cooperate to form a venturi nozzle to produce laminar flow through the center of the propeller shaft.

The usual cavitation plate common to outboard motors is replaced by a delta wing shaped semi-hydrofoil surface 260. Its area is not large enough to interfere with the retraction or tilting of the lower unit 32 but is large enough to add significant lift to the stern of a boat and thus added speed. Also, the point of application of the center of lift and center of pressure builds into the lower unit 32 a force tending to tilt the lower unit aft if the engine E should be stopped or the transmission shifted to neutral with the boat in motion.

In all of the lower units 32 disclosed by FIGURES 19–24, inclusive, the cross sectional area forward of the vertical shaft is less than that rearwardly thereof and induces a self straightening or caster effect on the steering. Also, on all lower units where propeller torque produces a side thrust on the lower unit 32, the propeller shaft is skewed slightly in the horizontal plane to offset the propeller torque.

As shown in FIGURES 19 and 20, one form of a detachable lower unit 32 which is one of several types not limited to marine use, is generally similar to an aircraft landing gear and used to support the stern of the boat B which might have retractable wheels up forward. This unit 32 attaches to the gear box 31 in the same manner as other units, is self-propelled, and while it can be readily adapted for brakes, braking effort is effected by manipulation (feathering) of the clutch control valve.

When the detachable wheeled unit is in use, it is locked against relative movement between it and the main housing 30 and power for traction is transferred from the shaft 44 to reduction gears within a gear box 270 to a wheel W supported on an H-shaped section 271 having a spring and shock absorber unit 272 enclosed in a flexible rubber bellows 273. Power to the wheel W is transmitted from the reduction gears by a suitable chain or chains, etc., enclosed in a housing 274 on one or both sides of the H-frame with two speeds being provided and controlled by a gear shift knob 275 on the gear box 270. If desired, gear shifting and braking could be effected pneumatically from the boat's air supply earlier described. The tire and wheel is wider than normal and the tire has a high traction tread. As in the case of other units 32, the wheeled unit is readily removed for storage.

FIGURES 21 and 22 disclose the use of a shroud ring 262 of aerodynamic cross-section, hydrofoil extruded material to increase propeller thrust and efficiency.

While a tractor propeller is more efficient than a pusher, it is more subject to damage by contact with underwater obstructions. Tractor and pusher propellers could be mounted on the same shaft and would enable a reduction in the diameter of the propellers. Contra-rotating propellers P and P1 (FIGURE 23) have been successfully used and the advantages thereof are: a high propeller efficiency; equalized side thrust or propeller torque effect on steering; smaller driving gears on propeller shafts and consequently a smaller cross-sectional area of the lower unit gear box; and smaller propeller diameter and as a result, a shorter lower unit.

FIGURES 23, 24 and 25 disclose the use of hydrofoils on a lower unit 32 which enables a smoother boat ride through rough water at higher speeds due to a lessened boat hull drag. Hydrofoils are the waterborne equivalent of an aircraft wing having a similar but considerably smaller cross section due to the difference between the densities of water and air. In the present invention, the lifting effect of the hydrofoil is variable through the tilt control mechanism, the hydrofoil and propeller are completely retractable for beaching or trailing, and the method of mounting the hydrofoil is stronger and less subject to vibration than commercially available hydrofoil kits for outboard motors. As shown, a pair of hydrofoil surfaces 263 is fixed at their upper ends to the ring 151 and extended outwardly and downwardly and are braced adjacent their lower ends by an additional pair 264 of hydrofoil surfaces connected to a lower sleeve extension of the ring casting 151. Thus the hydrofoil sections are connected at two points as shown in detail in FIGURE 25. The attachment of the lower hydrofoils 264 is by several studs 306 threaded thereinto and secured by nuts 307 by means of an opening in the lower portion of the ring casting 151 which is then closed by an access plate 308 and seal 309.

The hydrofoil unit is readily attached as desired in the manner of other units by means of the special adaptation and extension of the ring casting 151 from the upper or bull gear housing end. The bull gear 194 is bolted as at 313 to the flanged upper end of a sleeve 310 which is then installed in the extension of the ring casting 151. The sleeve 310 is threaded into the inner race of a bearing 300 and locked from turning out of the threaded portion of the sleeve 310 by a snap ring 311. The outer race of the bearing 300 is locked in position in the casting 151 by a dowel pin 303 and retained by a snap ring 305. The lower drive unit 32 is then attached to the inner race of the bearing 300 by the bolts 304.

It will be noted that when the hydrofoils are used, the cavitation plate does not rotate with the steering of the lower unit 32, the arc of which is lessened for safety. The cavitation plate is itself a hydrofoil surface made longer in the fore and aft directions and proportionately thicker than the hydrofoils 264 so that the housing supporting the bearing of the lower pivot point of the steering is streamlined and fitted into the hydrofoil contour which surface covers all of the projected area above the propeller P in all of the useable steering arc.

The range of the tilt adjustment is shorter when the unit 32 rotates beyond the vertical or 90° position with respect to the level water surface. There is a military application when a negative angle of attack of the hydrofoil with respect to the water would be useful. For pleasure boat use, this angle would be limited to positive angles of attack or positive lift. This effect may be partially offset by positioning the hydrofoil surface so that it has a minimum or slight positive angle of attack when the propeller axis is parallel with the water surface. Desirably, a mechanism similar to the tilt actuator could be connected to the auxiliary hydraulic connection described to control a set of forward hydrofoils so that the bow of the boat could be lifted by an increased angle of attack of the forward hydrofoils with respect to the rear hydrofoils attached to the invention.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. An outboard propulsion device to be mounted on the outer face of the transom of a boat having an inboard engine comprising, in combination, a generally U-shaped housing including a high pressure oil tank web portion and connecting legs extendable rearwardly from contact with the transom, a hydraulic tilting mechanism having elements rotatably mounted in one of said legs and projecting through the inner face thereof, a drive unit, including a drive shaft and a propellor mounted on said rotatable elements for rotation therewith and having a sealing relationship with the inner faces of said legs, a transmission including hydraulic clutches mounted in the other of said legs and having a drive shaft to project through the transom for driving engagement with the engine, a shaft drivably connecting said transmission and said drive unit shaft, an oil pump mounted on said transmission drive shaft in said other housing leg, pressure and return conduits connecting said pump with said clutches, said oil tank and said tilting mechanism, and valves controlling flow through said conduits for effecting operation of said clutches and the direction of propellor rotation, and of said tilting mechanism to vary the stern angle of said drive unit in a fore and aft vertical plane.

2. The combination recited in claim 1 wherein said drive unit comprises mating upper and lower housing and drive shaft portions, and said lower housing portion is supported on said upper housing portion for rotation about the enclosed shaft axis.

3. The combination recited in claim 2 wherein said mating portions are detachably connected, and sealing means extends between the bottom of the upper housing and drive shaft portions to prevent passage of fluid thereby.

4. The combination as recited in claim 1 wherein said housing includes means for limiting the angle of pivot of the drive unit as a result of thrust upon the reversal of the propellor.

5. The combination as recited in claim 4 wherein an arcuate slot is formed in the outer surface of said drive unit adjacent said tilting mechanism, a stop member is slidably mounted adjacent thereto, and hydraulically actuated means moves said stop into said slot upon reversal of the direction of propellor rotation by one of said control valves.

6. The combination as recited in claim 2 wherein a slot of predetermined length is formed centrally of the rear surface of said lower housing portion, and a screw projects through said upper housing portion into said slot to limit the relative rotation of said housing portions to effect an equal steering effort to either side of a fore and aft line.

7. The combination recited in claim 1 wherein a cam is mounted on said one rotatable element, a fluid filled chamber encloses said cam and is engageable and movable thereby to effect tilting of said drive unit, and reverse movement of said cam away from the engaged chamber surface is cushioned by movement of the fluid in the chamber past said cam to constitute a shock absorber for said drive unit.

8. The combination as recited in claim 1 wherein additional conduits are provided in said housing for cooling and lubrication thereof, and said housing includes oil pressure regulating means for controlling the oil pressure in said conduits and said additional conduits at high and low levels.

9. The combination recited in claim 1 wherein a compressed air system including a hydraulically activated air compressor is mounted in said one leg of said housing, and conduits including control valves connect said high pressure oil tank and said compressor to actuate the latter and provide a source of compressed air.

10. The combination recited in claim 7 wherein a recess is formed in the outer periphery of said fluid filled chamber, a switch connected with the ignition circuit of the engine is mounted in the housing and includes, a depressible actuator to open said circuit projecting into said recess, and excessive pivotal movement of said drive unit effects movement of said actuator out of said recess to open said ignition circuit.

11. The combination with an outboard drive unit including a drive shaft and a propellor adapted to be attached to a boat transom and pivoted in a vertical fore and aft plane for adjustment of the stern angle of the boat and having a portion rotatable in a plane at right angles thereto to effect steering; of a hollow hub mounting said propellor, said hub having a venturi shape in longitudinal cross-section to provide laminar flow therethrough and eliminate customary turbulent flow.

12. The combination recited in claim 1 wherein a friction surface is fixed to a surface of one of said tilting mechanism rotatable elements and engages the adjacent inner face of said one leg to increase the force necessary to effect pivoting of said unit.

13. The combination recited in claim 9 wherein inflatable end caps for use as rear bumpers are fixed to the rear of said legs, and conduit means connect said caps with said compressed air system for inflation thereby.

14. The combination recited in claim 1 wherein transparent end caps are fixed to the rear of said legs, and portions of an electrical circuit including light bulbs are mounted in said caps to function as tail lights for said drive unit.

15. An outboard propulsion device adapted to be mounted on the transom of a boat having an inboard engine comprising, in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a vertical plane; said drive unit comprising an upper portion and a lower portion rotatable with respect thereto about the drive unit axis in any position of vertical movement of said drive unit; means mounted in said housing for effecting movement of said drive unit; and power means operably connected with said upper portion to effect pivotal movement thereof, said power means including a shaft mounted in said housing for rotation about the pivotal axis of said drive unit, a cam mounted on one end of said shaft and bearing against said upper portion of said drive unit at a point spaced from said pivotal axis, and fluid operated means engaging the other end of said shaft and operatively connected therewith to effect rotation thereof so that rotary movement of said shaft and cam effects pivoting of said drive unit; said cam being enclosed in a fluid containing housing forming a part of said upper unit and functioning as a shock absorber on the passage of said fluid past said cam upon relative movement of said upper portion housing and said cam.

16. An outboard propulsion device adapted to be mounted on the transom of a boat having an inboard engine comprising in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis in any position, means including gears mounted in said housing for effecting movement of said drive unit, said last mentioned means comprising steering mechanism projecting into said drive unit and having an operable connection with said lower portion thereof to rotate it and effect steering of the boat, a slot having ends formed in the periphery of said rotatable portion, and a pin attached to said upper portion and projecting into the slot to engage an end thereof to limit relative rotation of said drive portion.

17. An outboard propulsion device adapted to be mounted on the transom of a boat having an inboard engine comprising, in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis in any pivotal position, means including gears mounted in said housing for effecting movement of said drive unit, said last mentioned means comprising steering mechanism including gears projecting into said drive unit and having an operable connection with said lower portion thereof to rotate and effect steering of the boat, and means for detaching said lower portion of said drive unit from said upper portion without disturbance of the driving and steering mechanism.

18. The combination as recited in claim 17 wherein said housing, said upper portion, and said lower portion of said drive unit comprise cooperating connecting and enclosed units each including seals permitting relative movement with respect to each other without loss of power, lubricating or cooling fluid or entry of water.

19. An outboard propulsion device adapted to be mounted on the transom of a boat having an inboard engine comprising, in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis in any position, means including gears mounted in said housing for effecting movement of said unit, clutches comprising a portion of said transmission means and connectible with said drive shafts to vary the direction of rotation of the propeller, the periphery of said drive unit including an arcuate slot, and a stop member mounted on said housing projecting into said slot whereby the engagement of one of said clutches to reversely rotate the propeller, reverses the thrust and effects pivoting of said drive unit and movement of said stop member through the limited arc of said slot.

20. An outboard propulsion device adapted to be mounted on the transom of a boat having an inboard engine comprising, in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis in any position, means mounted in said housing for effecting movement of said drive unit, a closed shock absorber housing mounted in the upper portion of said drive unit and including fluid therein, and a cam rotatably mounted on said first mentioned housing and projecting into said closed housing for movement from one end to another therein against the fluid upon vertical pivotal movement of said drive unit to cushion such movement.

21. An outboard propulsion device adapted to be mounted on the transom of a boat having an inboard engine comprising, in combination, a housing; transmission means arranged in said housing including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis to effect steering in any position, means including gears mounted in said housing for effecting movement of said drive unit, said last mentioned means comprising mechanisms for pivoting said drive unit and for rotating said lower portions, and means interconnecting said pivoting and rotating mechanisms to effect partial operation of one of said mechanisms by completion of operation of the other of said mechanisms.

22. An outboard propulsion device adapted to be mounted on the transom of a boat having an inboard engine, comprising in combination, a housing; transmission means arranged in said housing and including a drive shaft to project through the transom and having a driving connection with the engine; a drive unit including a drive shaft and a propeller, drivably connected with said transmission means and pivotally mounted on said housing for movement in a fore and aft vertical plane; said drive unit comprising an upper portion and a lower portion rotatable with respect thereto about the drive unit axis in any position, means mounted in said housing for effecting movement of said drive unit, and power means operably connected with said upper portion to effect pivotal movement thereof, said power means including a shaft mounted in said housing for rotation about the pivotal axis of said drive unit, a cam mounted on one end of said shaft and bearing against said upper portion of said drive unit at a point spaced from said pivotal axis, and fluid operated means engaging the other end of said shaft and operatively connected therewith to effect rotation thereof so that rotary movement of said shaft and cam effects pivoting of said drive unit.

23. The combination as recited in claim 22 wherein an hydraulic system is arranged in said housing and includes a pump driven by said transmission drive shaft, conduits connecting said pump and said fluid operated means to effect movement of the latter and valve means controlling the flow of fluid in said conduits.

24. The combination as recited in claim 22 wherein said fluid operated means comprises a piston.

25. The combination as recited in claim 22 wherein said fluid operated means comprises a rotatable vaned element.

26. The combination recited in claim 16, said steering mechanism including a control shaft projecting out of said drive unit, and a gear mounted on the inner end of the control shaft and meshing with one of said gears, said gears being locked when said pin engages an end of said slot and said control shaft being further operable to pivot said drive unit as a whole upon further rotation of said control shaft.

27. The combination with an outboard drive unit adapted to be attached to a boat transom and pivoted in a vertical fore and aft plane for adjustment of the stern angle of the boat and having a lower portion rotatable about the axis of and with respect to the drive unit to effect steering; of hydrofoils mounted on and extending laterally outwardly of the drive unit to lift the stern and lessen the drag of the boat, said hydrofoils having relative rotary movement with respect to said lower portion of said drive unit so as not to be rotated by steering movement thereof.

28. The combination with an outboard drive unit adapted to be attached to a boat transom and pivoted in a vertical fore and aft plane for adjustment of the stern angle of the boat and having a lower portion rotatable about the axis of and with respect to the drive unit to effect steering; of hydrofoils mounted on and extending laterally outwardly of the drive unit to lift the stern and lessen the drag of the boat, said hydrofoils being pivotable with said drive unit to vary the angle of attack of the hydrofoils and having relative rotary movement with respect to said lower portion of said drive unit so as not to be rotated by steering movement thereof.

References Cited in the file of this patent

UNITED STATES PATENTS

| | | |
|---|---|---|
| 899,359 | Wadagaki | Sept. 22, 1908 |
| 1,361,902 | Porteous | Dec. 14, 1920 |
| 2,146,623 | Caroland | Feb. 7, 1939 |
| 2,458,813 | Wanzer | Jan. 11, 1949 |
| 2,532,470 | Wanzer | Dec. 5, 1950 |
| 2,656,809 | Frasure | Oct. 27, 1953 |
| 2,656,812 | Kiekhaefer | Oct. 27, 1953 |
| 2,681,029 | Canazzi | June 15, 1954 |
| 2,705,468 | Dix | Apr. 5, 1955 |
| 2,714,866 | Pleuger | Aug. 9, 1955 |
| 2,755,766 | Wanzer | July 24, 1956 |
| 2,795,202 | Hook | June 11, 1957 |
| 2,800,150 | Farwell | July 23, 1957 |
| 2,856,877 | Baker | Oct. 21, 1958 |
| 2,917,019 | Krueger | Dec. 15, 1959 |
| 2,918,029 | Legat | Dec. 22, 1959 |
| 2,923,269 | Hoyt | Feb. 2, 1960 |
| 2,946,306 | Leipert | July 26, 1960 |
| 2,988,039 | Nimmo | June 13, 1961 |

FOREIGN PATENTS

| | | |
|---|---|---|
| 1,194,504 | France | Feb. 13, 1958 |